US007706583B2

(12) United States Patent
Takei

(10) Patent No.: US 7,706,583 B2
(45) Date of Patent: Apr. 27, 2010

(54) IMAGE PROCESSING APPARATUS AND METHOD

(75) Inventor: Hirofumi Takei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1776 days.

(21) Appl. No.: 10/701,504

(22) Filed: Nov. 6, 2003

(65) Prior Publication Data

US 2004/0091240 A1 May 13, 2004

(30) Foreign Application Priority Data

Nov. 11, 2002 (JP) ............................. 2002-326935
Feb. 10, 2003 (JP) ............................. 2003-032267

(51) Int. Cl.
*H04N 5/85* (2006.01)
(52) U.S. Cl. ...................... 382/125; 386/112; 386/126; 386/114; 382/248; 356/432; 704/501
(58) Field of Classification Search .................. 386/52, 386/111–112, 114, 124–125, 126; 356/432; 382/248; 348/241; 704/501
See application file for complete search history.

(56) References Cited

U.S. PATENT DOCUMENTS

| 5,420,630 | A | | 5/1995 | Takei | 348/228 |
|---|---|---|---|---|---|
| 5,757,428 | A | | 5/1998 | Takei | 348/333 |
| 5,831,672 | A | | 11/1998 | Takei | 348/225 |
| 5,881,176 | A | * | 3/1999 | Keith et al. | 382/248 |
| 6,148,141 | A | * | 11/2000 | Maeda et al. | 386/112 |
| 6,275,294 | B1 | * | 8/2001 | Folestad | 356/432 |
| 6,545,709 | B2 | | 4/2003 | Takei et al. | 348/222 |
| 6,553,071 | B1 | * | 4/2003 | Kim et al. | 375/240.19 |
| 2001/0051036 | A1 | | 12/2001 | Suzuki | 386/68 |
| 2002/0080954 | A1 | * | 6/2002 | Felder et al. | 379/386 |
| 2003/0063201 | A1 | * | 4/2003 | Hunter et al. | 348/241 |
| 2003/0179943 | A1 | * | 9/2003 | Okada et al. | 382/240 |
| 2004/0114819 | A1 | * | 6/2004 | Matsuura et al. | 382/239 |

FOREIGN PATENT DOCUMENTS

| JP | 2-301268 | 12/1990 |
|---|---|---|
| JP | 7-162851 | 6/1995 |
| JP | 11-313205 | 11/1999 |
| JP | 2001-352524 | 12/2001 |

\* cited by examiner

*Primary Examiner*—Thai Tran
*Assistant Examiner*—Helen Shibru
(74) *Attorney, Agent, or Firm*—Fitzpatrick, Cella, Harper & Scinto

(57) ABSTRACT

There is disclosed an image processing apparatus which implements an image process suitable for an effect for compositing or switching images, and an image process that allows smooth high-speed playback of even an image in motion. The apparatus has band segmentation means for segmenting an image signal into a plurality of frequency band components, and image composition means for, after the band segmentation means segments input first and second image signals, outputting a third image signal by replacing image data for respective segmented band components. When image data, which are recorded while being segmented into a plurality of frequency band components, are composited for respective band, and the composite image data is output, image data obtained by compositing a plurality of image frequency components is decoded and played back in a high-speed playback mode.

5 Claims, 24 Drawing Sheets

START OF SWITCHING

1ST TO 30TH FRAMES

31ST TO 60TH FRAMES

61ST TO 90TH FRAMES

91ST TO 120TH FRAMES

END OF SWITCHING

SCENE A  SCENE B

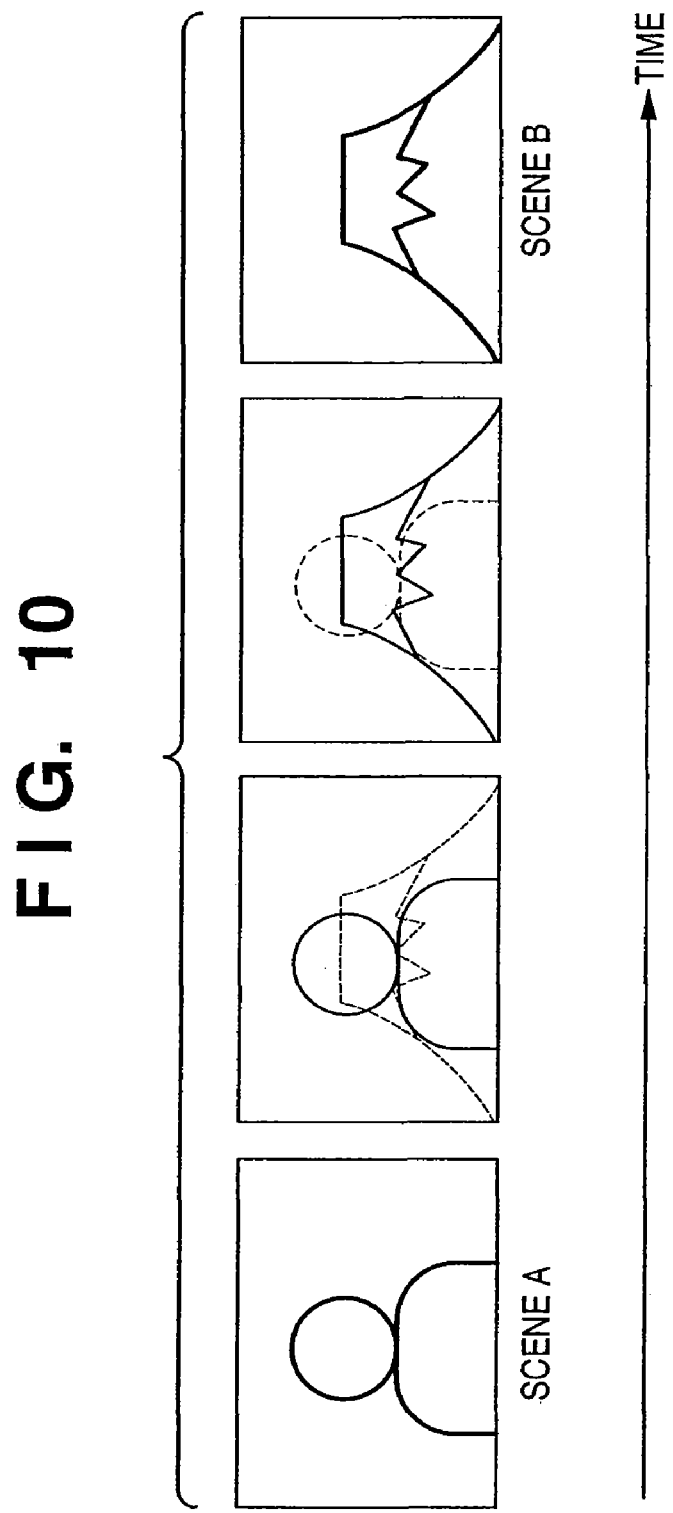

START OF SWITCHING

1ST TO 8TH FRAMES

9TH TO 16TH FRAMES

17TH TO 24TH FRAMES

25TH TO 32ND FRAMES

| LLa | HL2a | HL1a |
|---|---|---|
| LH2a | HH2a | |
| LH1a | | HH1a |

START OF SWITCHING

| LLa | HL2a | HL1a |
|---|---|---|
| LH2a | HH2a | |
| LH1a | | HH1a×0.7 + HH1b×0.3 |

1ST TO 8TH FRAMES

| LLa | HL2a | HL1a |
|---|---|---|
| LH2a | HH2a | |
| LH1a | | HH1a×0.5 + HH1b×0.5 |

9TH TO 16TH FRAMES

| LLa | HL2a | HL1a |
|---|---|---|
| LH2a | HH2a | |
| LH1a | | HH1a×0.3 + HH1b×0.7 |

17TH TO 24TH FRAMES

| LLa | HL2a | HL1a |
|---|---|---|
| LH2a | HH2a | |
| LH1a | | HH1b |

25TH TO 32ND FRAMES

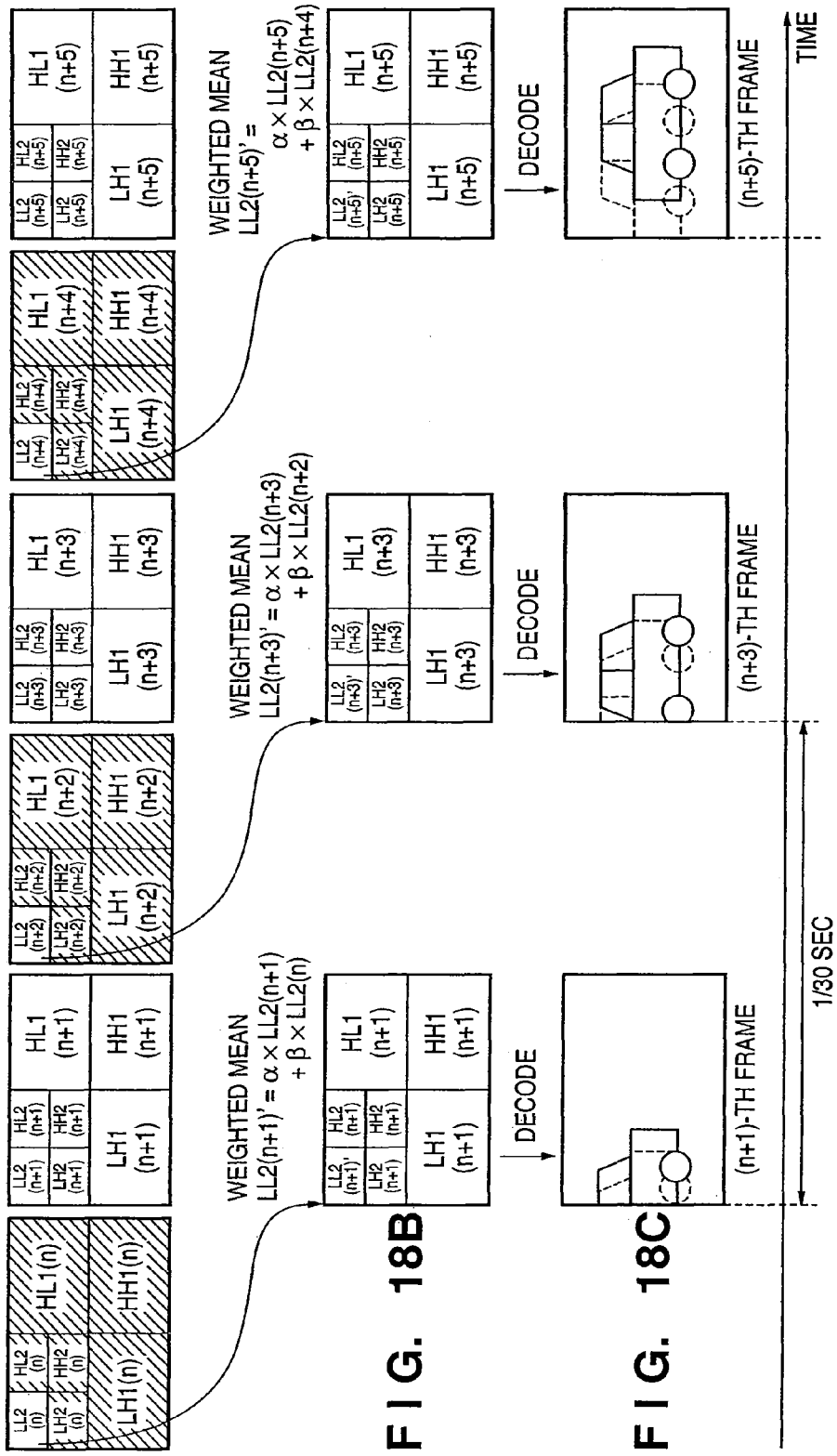

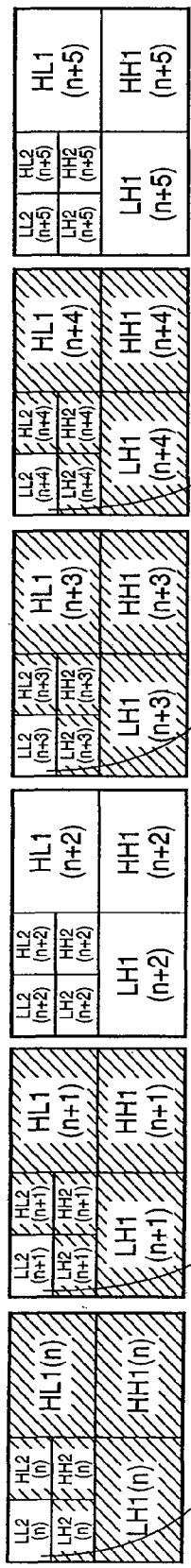
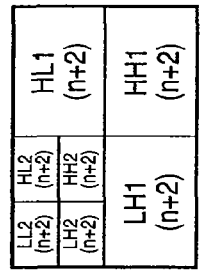
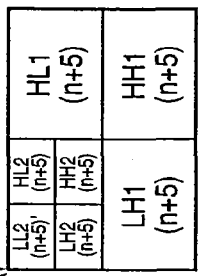
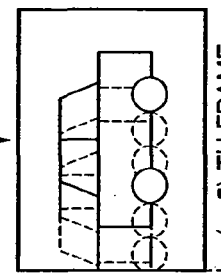
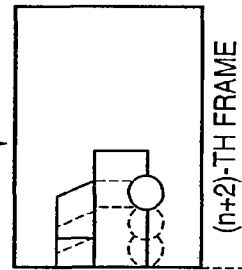
FIG. 19A  FIG. 19B  FIG. 19C

WEIGHTED MEAN $LL2(n+1)' = \alpha \times LL2(n+1) + \beta \times LL2(n)$
$HL2(n+1)' = \alpha \times HL2(n+1) + \beta \times HL2(n)$
$LH2(n+1)' = \alpha \times LH2(n+1) + \beta \times LH2(n)$
$HH2(n+1)' = \alpha \times HH2(n+1) + \beta \times HH2(n)$

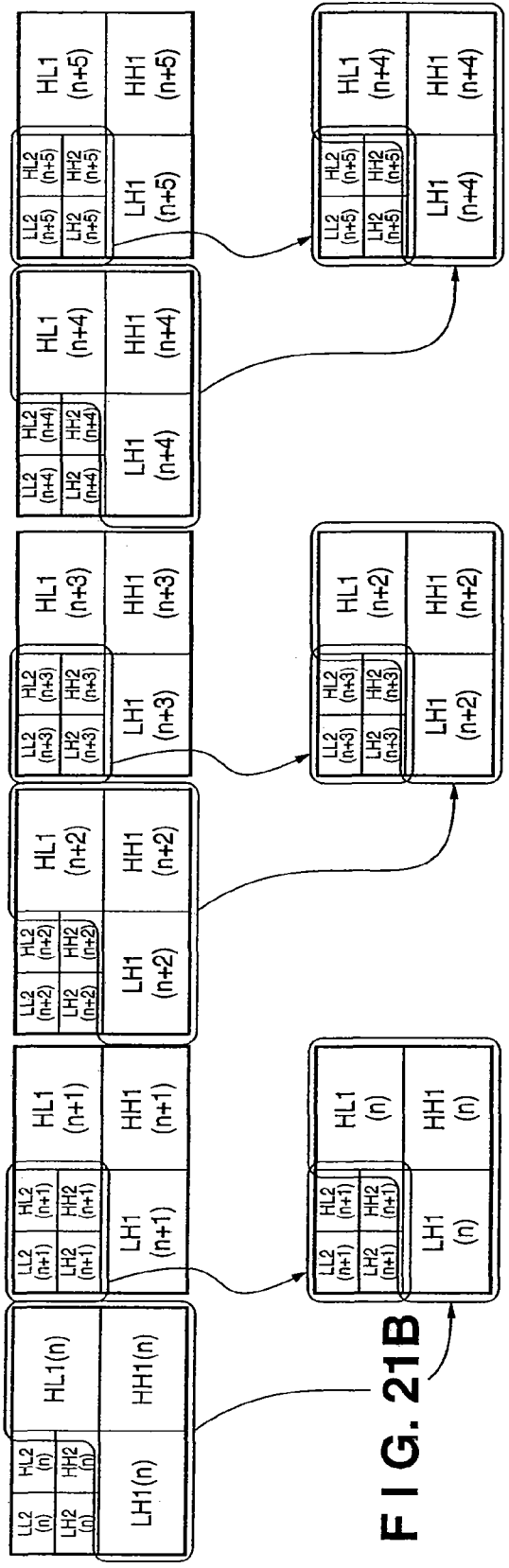
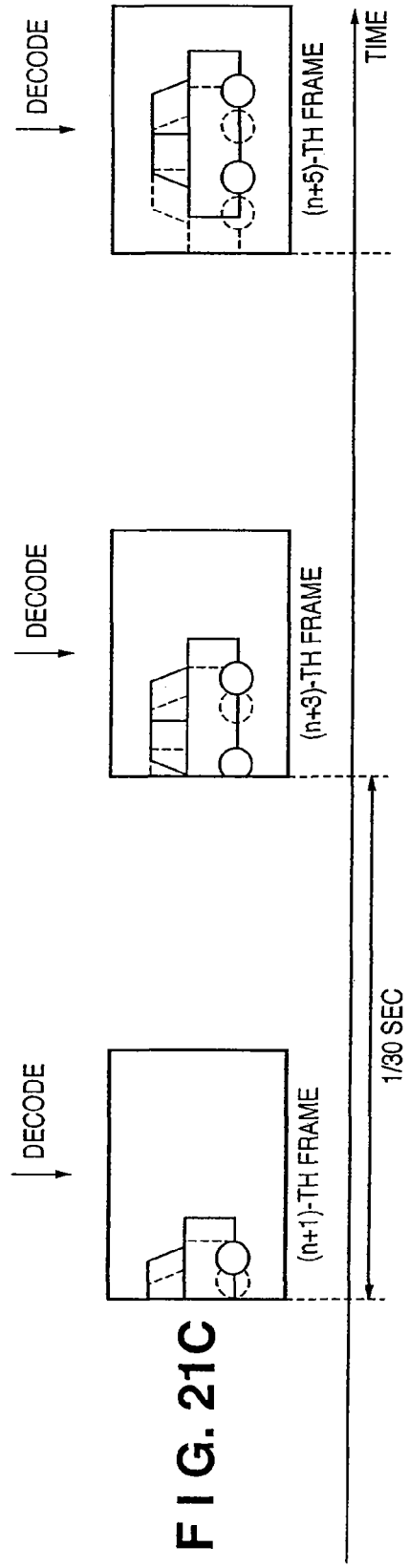
FIG. 21A
FIG. 21B
FIG. 21C

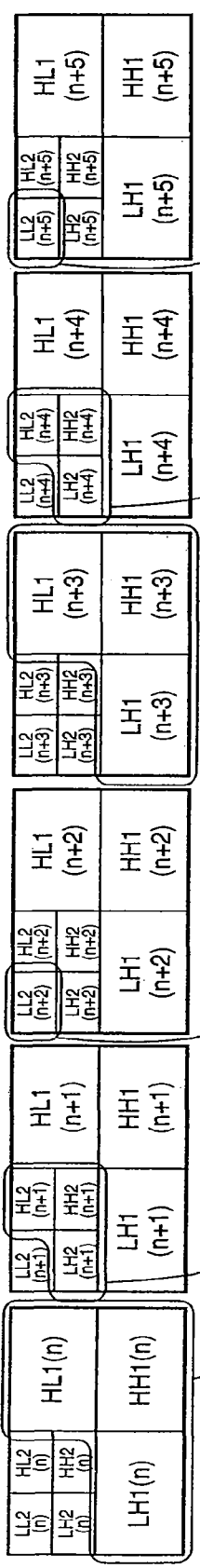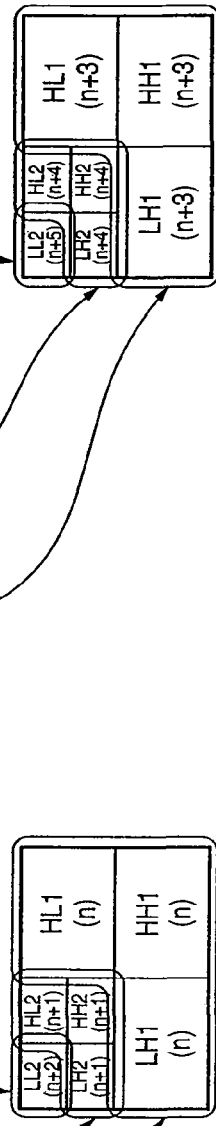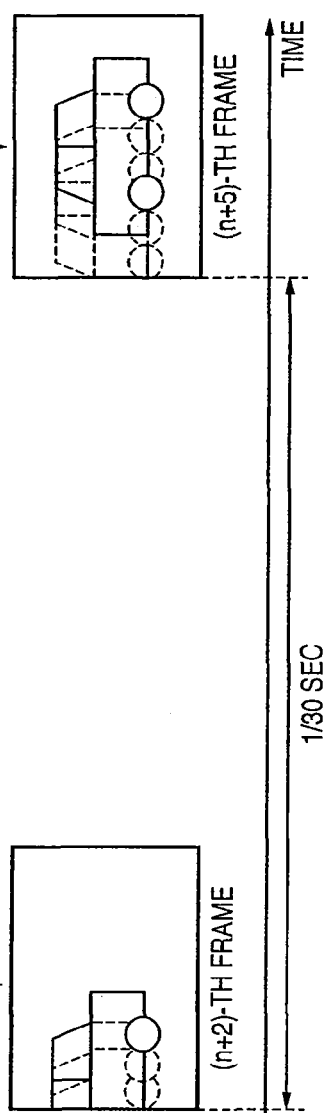
FIG. 22A
FIG. 22B
FIG. 22C

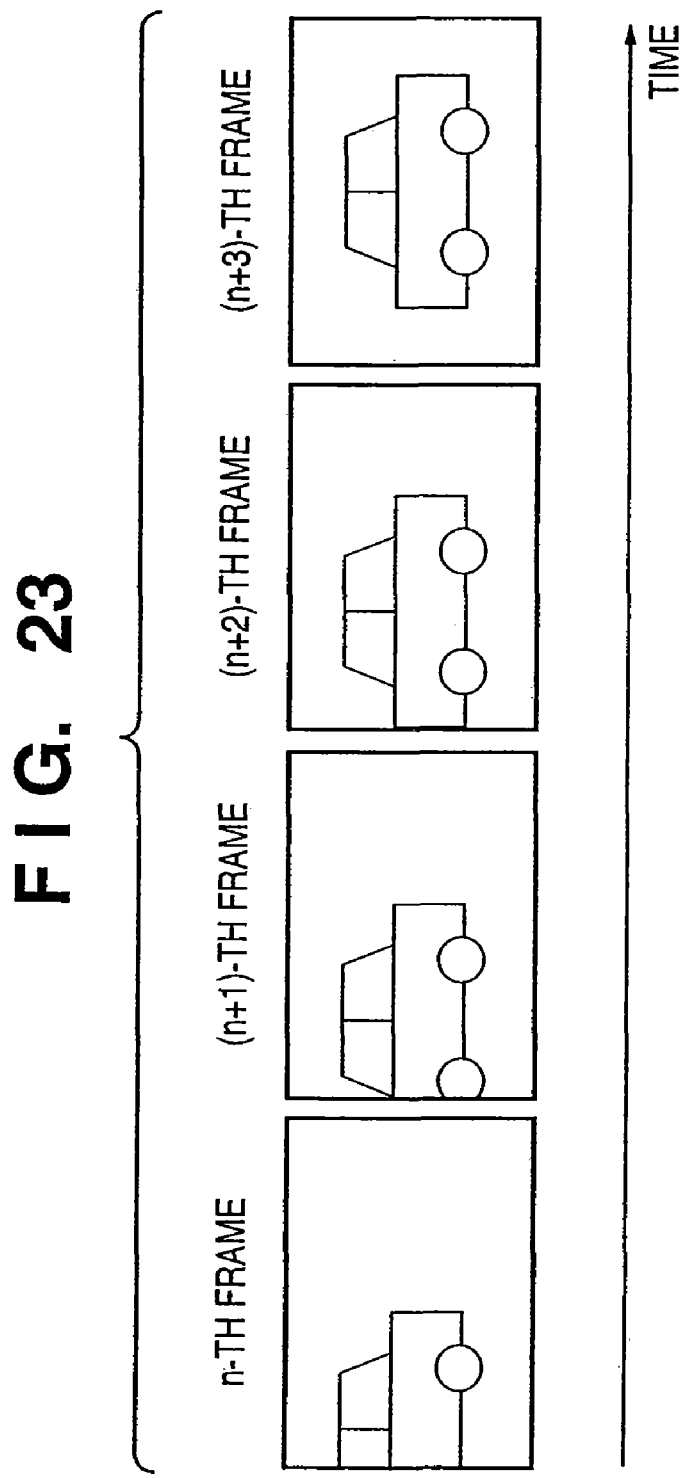

IMAGE PROCESSING APPARATUS AND METHOD

FIELD OF THE INVENTION

The present invention relates to an image processing method and apparatus for compositing or switching a plurality of image signals, and playing back an image at high speed.

BACKGROUND OF THE INVENTION

As a conventional image processing method that composites or switches a plurality of input image signals, a process called "cross-fade" that switches image A to image B by adding baseband signals of two input images at a predetermined ratio, and changing the addition ratio along with the elapse of time, as shown in FIG. 13, is known. Also, an image processing method called "wipe" that switches baseband signals of two input images from image A to image B from the right to left of the screen along with the elapse of time, as shown in FIG. 14, is known. These image processes "cross-fade" and "wipe" are used upon, e.g., switching photographing scenes in a video camera as effects upon photographing (e.g., see Japanese Patent Laid-Open No. 2-301268).

As another image processing method that composites a plurality of images, an image processing method that extracts low- and high-frequency components from two input images, composites the high-frequency components of the two images, and composites the composited high-frequency components to the low-frequency components of one image so as to obtain a third image is known. Since the third image generated in this way contains the high-frequency components of the two images, a high-definition composite image can be obtained (e.g., see Japanese Patent Laid-Open No. 11-313205).

However, since the conventional image processes such as "cross-face", "wipe", and the like are executed using baseband signals such as luminance signals, color difference signals, and the like as image signals to be composited or replaced, the visual effects are limited.

Also, since the conventional image process that composites the high-frequency components of two images, and then composites the composited high-frequency components to the low-frequency components of one image aims at emphasizing the edge of one image generated by composition, such process is not suited as an effect upon switching seamless images such as a moving image.

Conventionally, a demand has arisen for a playback process faster than an actual recording time for the purpose of searching for desired contents within a short period of time, roughly recognizing the overall flow, and so forth upon playing back time-sequential image data such as moving image data.

An image processing apparatus having such high-speed playback function is available. In general, since a moving image is a set of images for one screen called a frame, a high-speed playback function is implemented by downsampled playback (e.g., by playing back recorded frames at intervals of several frames).

However, when such downsampled playback is made, as the playback speed increases (i.e., as the number of frames to be downsampled increases), a moving image to be played back becomes jerky, and the visual characteristics are not good.

As a high-speed playback method with improved visual characteristics, for example, Japanese Patent Laid-Open No. 7-162851 discloses a high-speed playback method which plays back only intra-encoded frames of encoded image data in which one intra-encoded frame and a plurality of inter-encoded frames alternately appear. Also, as described in Japanese Patent Laid-Open No. 7-162851, an intra-encoded frame is broken up into partial images called slices obtained by segmenting that frame in the horizontal direction, and one slice/frame is played back to attain quicker playback.

Furthermore, Japanese Patent Laid-Open No. 2001-352524 has proposed a method of generating a composite image for one frame from partial images of a plurality of successive frames, and playing back that composite image upon playing back a moving image encoded by MPEG at high speed.

The high-speed playback methods proposed by these references can display visually smooth motion of images even in the high-speed playback mode compared to simple frame downsampling. However, in these proposals, since a plurality of frame images are sliced (segmented) into rectangular patterns and a composite image for one frame is reconstructed by combining slice images of the respective frame images, the composite image includes images photographed at different times together.

For this reason, when a composite image is generated from images for four frames with inter-frame motions, as shown in FIG. 23, a composite image having deviations shown in FIG. 24 is obtained, and the reproduced image is visually not preferable.

In order to attain high-speed playback while generating such composite images, since a plurality of images must be read out, composited, and played back within a normal playback processing time for one frame, the load on the processing of the apparatus becomes heavier, and resources such as memories and the like are required in large quantities. For example, in the method proposed by Japanese Patent Laid-Open No. 2001-352524, data must be read out at a double speed in a double-speed playback mode.

SUMMARY OF THE INVENTION

It is one of principal objects of the present invention to provide an image processing method and apparatus, which can solve the aforementioned problems, and can be suitably used as an effect upon switching a moving image.

It is another principal object of the present invention to provide an image processing method and apparatus, which can make smooth display by a simple process even in a high-speed playback mode irrespective of the motion speed.

According to one aspect of the present invention, an image processing apparatus for receiving and processing a plurality of image signals, comprising: band segmentation means for segmenting an image signal into different frequency band components; and image composition means for, after the band segmentation means segments a plurality of image signals, compositing the plurality of image signals by replacing some or all image data in common frequency band components among the plurality of image signals, and outputting one image signal.

According to another aspect of the present invention, an image processing apparatus for receiving and processing a plurality of image signals, comprising: image composition means for receiving a plurality of image signals, which have been segmented into frequency band components, and compositing the plurality of image signals by replacing some or all image data in a predetermined frequency band component among the plurality of image signals; and image output means for outputting the images composited by the image composition means as a moving image upon changing the predetermined frequency band component processed by the image composition means along with an elapse of time.

According to further aspect of the present invention, an image processing method for receiving and processing a plurality of image signals, comprising: a band segmentation step of segmenting an image signal into different frequency band components; and an image composition step of compositing, after a plurality of image signals are segmented in the band segmentation step, the plurality of image signals by replacing some or all image data in common frequency band components among the plurality of image signals, and outputting one image signal.

According to another aspect of the present invention, an image processing method for receiving and processing a plurality of image signals, comprising: an image composition step of receiving a plurality of image signals, which have been segmented into frequency band components, and compositing the plurality of image signals by replacing some or all image data in a predetermined frequency band component among the plurality of image signals; and an image output step of outputting the images composited in the image composition step as a moving image upon changing the predetermined frequency band component processed in the image composition step along with an elapse of time.

According to one aspect of the present invention, a computer-readable medium storing a program code for causing a computer to execute: a band segmentation step of segmenting an image signal into different frequency band components; and an image composition step of compositing, after a plurality of image signals are segmented in the band segmentation step, the plurality of image signals by replacing some or all image data in common frequency band components among the plurality of image signals, and outputting one image signal.

According to another aspect of the present invention, a computer-readable medium storing a program code for causing a computer to execute: an image composition step of receiving a plurality of image signals, which have been segmented into frequency band components, and compositing the plurality of image signals by replacing some or all image data in a predetermined frequency band component among the plurality of image signals; and an image output step of outputting the images composited in the image composition step as a moving image upon changing the predetermined frequency band component processed in the image composition step along with an elapse of time.

According to one aspect of the present invention, an image processing apparatus for compositing image data, which are recorded while being segmented into a plurality of frequency band components, for respective bands, and outputting composite image data, comprising: data acquisition means for acquiring the image data; playback output means for compositing the acquired image data for respective bands, and outputting composite image data; and control means for controlling the data acquisition means and the playback output means in accordance with a playback condition, wherein when one image is to be composited and played back on the basis of image data which form m (m is an integer not less than 2) successive images, the control means controls the data acquisition means to acquire data of some frequency band components of the plurality of frequency band components from each of image data which form (m−1) images, and to acquire data of at least some frequency band components of the plurality of frequency band components from image data which form the remaining one image, and the control means controls the playback output means to composite the one image for respective bands based on the acquired data, and to output the composite image.

According to one aspect of the present invention, an image processing method for compositing image data, which are recorded while being segmented into a plurality of frequency band components, for respective bands, and outputting composite image data, comprising: a data acquisition step of acquiring the image data; a playback output step of compositing the acquired image data for respective bands, and outputting composite image data; and a control step of controlling the data acquisition step and the playback output step in accordance with a playback condition, wherein when one image is to be composited and played back on the basis of image data which form m (m is an integer not less than 2) successive images, the control step includes: a step of controlling the data acquisition step to acquire data of some frequency band components of the plurality of frequency band components from each of image data which form (m−1) images, and to acquire data of at least some frequency band components of the plurality of frequency band components from image data which form the remaining one image, and a step of controlling the playback output step to composite the one image for respective bands based on the acquired data, and to output the composite image.

According to another aspect of the present invention, a computer-readable medium storing a program code for causing a computer to execute: a data acquisition step of acquiring image data which is recorded while being segmented into a plurality of frequency band components; a playback output step of compositing the acquired image data for respective bands, and outputting composite image data; and a control step of controlling the data acquisition step and the playback output step in accordance with a playback condition, wherein when one image is to be composited and played back on the basis of image data which form m (m is an integer not less than 2) successive images, the control step includes: a step of controlling the data acquisition step to acquire data of some frequency band components of the plurality of frequency band components from each of image data which form (m−1) images, and to acquire data of at least some frequency band components of the plurality of frequency band components from image data which form the remaining one image, and a step of controlling the playback output step to composite the one image for respective bands based on the acquired data, and to output the composite image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view for explaining the cross-fade process of the present invention;

FIGS. 18A to 18C are views for explaining the relationship between subband transform coefficients to be read out from respective frames and images to be decoded and played back in a double-speed playback mode in the third embodiment;

FIGS. 19A to 19C are views for explaining the relationship between subband transform coefficients to be read out from respective frames and images to be decoded and played back in a triple-speed playback mode in the third embodiment;

FIGS. 21A to 21C are views for explaining the relationship between subband transform coefficients to be read out from respective frames and images to be decoded and played back in a double-speed playback mode in the fourth embodiment;

FIGS. 22A to 22C are views for explaining the relationship between subband transform coefficients to be read out from respective frames and images to be decoded and played back in a triple-speed playback mode in the fourth embodiment;

FIG. 23 shows an example of images with inter-frame motions; and

DETAILED DESCRIPTION OF THE PREFERRED EMBODIMENTS

Preferred embodiments of the present invention will now be described in detail in accordance with the accompanying drawings.

First Embodiment

Figure 1:
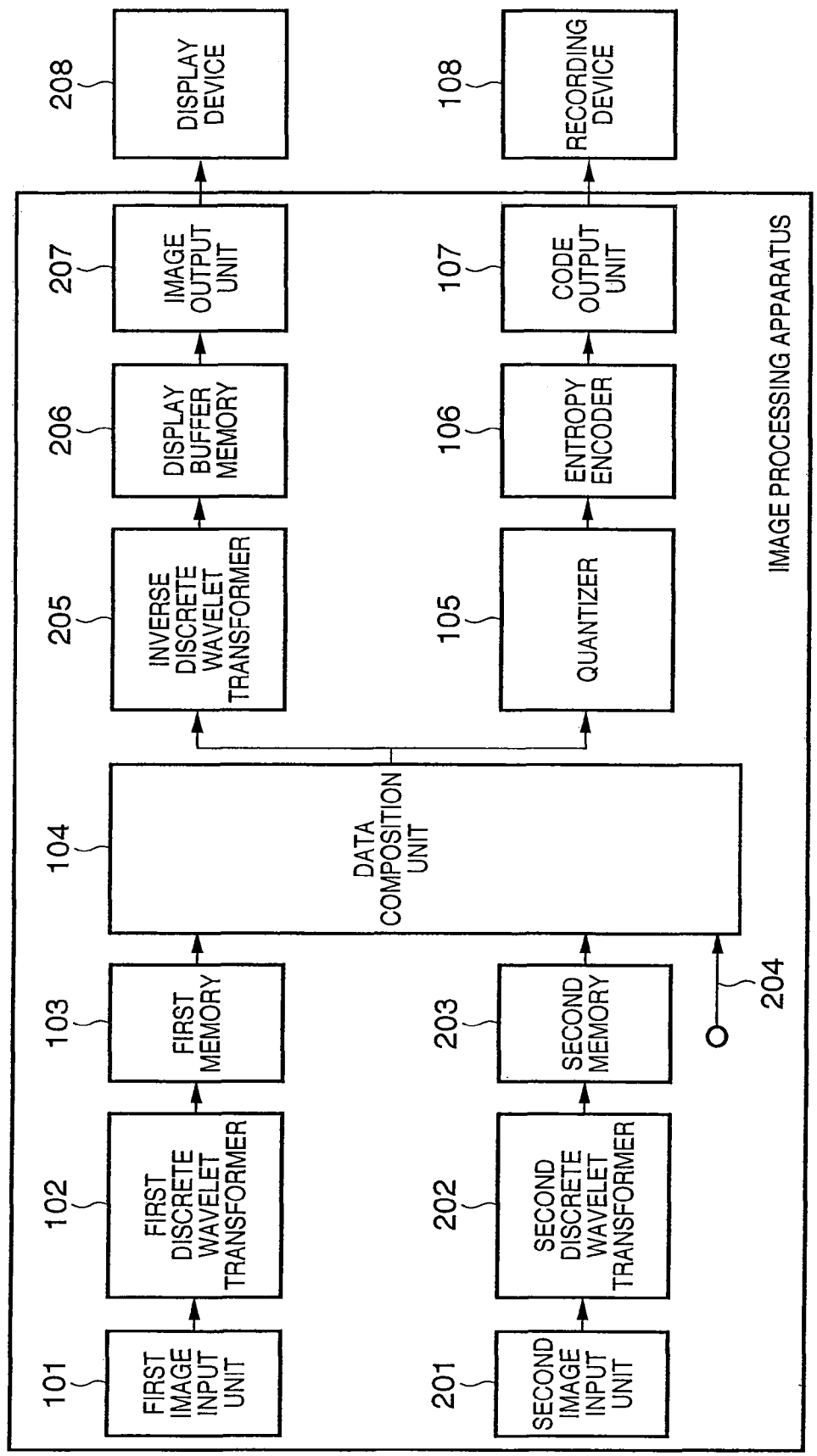
FIG. 1 is a block diagram of a system which includes an image processing apparatus according to the first embodiment of the present invention.

FIG. 1 is a block diagram showing an example of the arrangement of an image processing system as a combination of an image processing apparatus according to the first embodiment of the present invention, a recording device, and a display device.

The image processing apparatus of the present invention executes a band segmentation process, composition process, compression process, and expansion process of an image using a method complying with so-called JPEG2000 whose standardization is under consideration as an image compression encoding technique. Since the fundamental technology of JPEG2000 has been explained in ISO/IEC 15444 and the like in detail, only techniques associated with this embodiment will be selectively explained in association with the operation of the image processing apparatus.

Referring to FIG. 1, reference numeral 101 denotes a first image input unit; 102, a first discrete wavelet transformer; and 103, a first memory. Reference numeral 104 denotes a data composition unit; 105, a quantizer; 106, an entropy encoder; 107, a code output unit; and 108, a recording device. Furthermore, reference numeral 201 denotes a second image input unit; 202, a second discrete wavelet transformer; and 203, a second memory. Reference numeral 204 denotes an external input unit (or terminal). Reference numeral 205 denotes an inverse discrete wavelet transformer; 206, a display buffer memory; 207, an image output unit; and 208, a display device.

The first image input unit 101 is connected to an image-sensing device such as a camera or the like, or an external image signal output device. The first image input unit 101 inputs luminance and chromaticity signals which form a first image signal to be encoded in a raster scan order, and the input signals undergo transformation in the first discrete wavelet transformer 102.

Figure 2A:
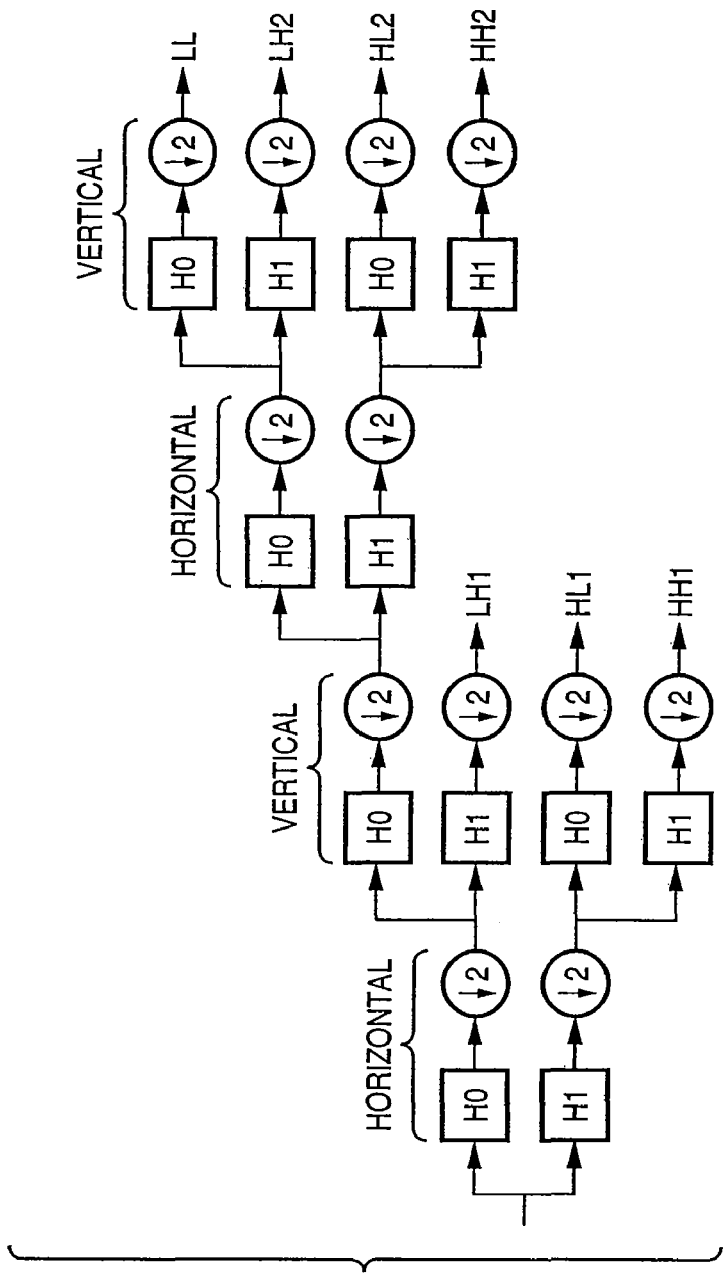
FIGS. 2A and 2B are views for explaining the operation of a discrete wavelet transformer and subbands.

FIG. 2A shows the arrangement of the first discrete wavelet transformer 102 which segments an input signal into bands. In FIG. 2A, H0 and H1 represent FIR filters. Filter H0 has low pass characteristics, and filter H1 has high pass characteristics. Also, each circle having a downward arrow symbol represents downsampling. An input multi-valued image signal is processed by filters H0 and H1 to be segmented into signals of different frequency bands, and each segmented signal is downsampled to 2:1.

In FIG. 2A, an input multi-valued image signal undergoes horizontal and vertical transformation processes as one set. Upon completion of the first set of processes, the same processes are repeated for a signal of the lowest frequency band, thus finally outputting a series of data which belong to seven different frequency bands.

Figure 2B:
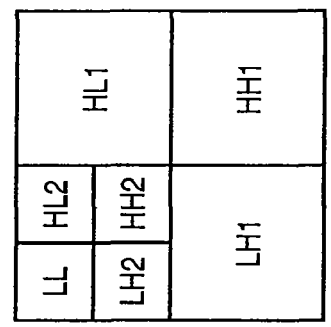

FIG. 2B shows a state wherein the input multi-valued image signal is segmented into different frequency bands as a result of the transformation process by the first discrete wavelet transformer 102 with the arrangement shown in FIG. 2A. In this example, the respective frequency bands are labeled as HH1, HL1, LH1, HH2, HL2, LH2, and LL. In the following description, one set of transformation processes in the horizontal and vertical directions are considered as one level of decomposition, and the frequency bands HH1, HL1, LH1, . . . , LL will be referred to as subbands.

The image signal which has been segmented into bands by the first discrete wavelet transformer 102 is stored as a first data group in the first memory 103.

Likewise, an image signal input from the second image input unit 201 is segmented into bands to generate subbands HH1, HL1, LH1, . . . , LL of the respective frequency bands, and is stored as a second data group in the second memory 203.

When the two input images do not undergo any composition or switching process, for example, the first data group output from the memory 103 passes through the data composition unit 104 intact, and is input to the next quantizer 105 or inverse discrete wavelet transformer 205.

Figure 3:
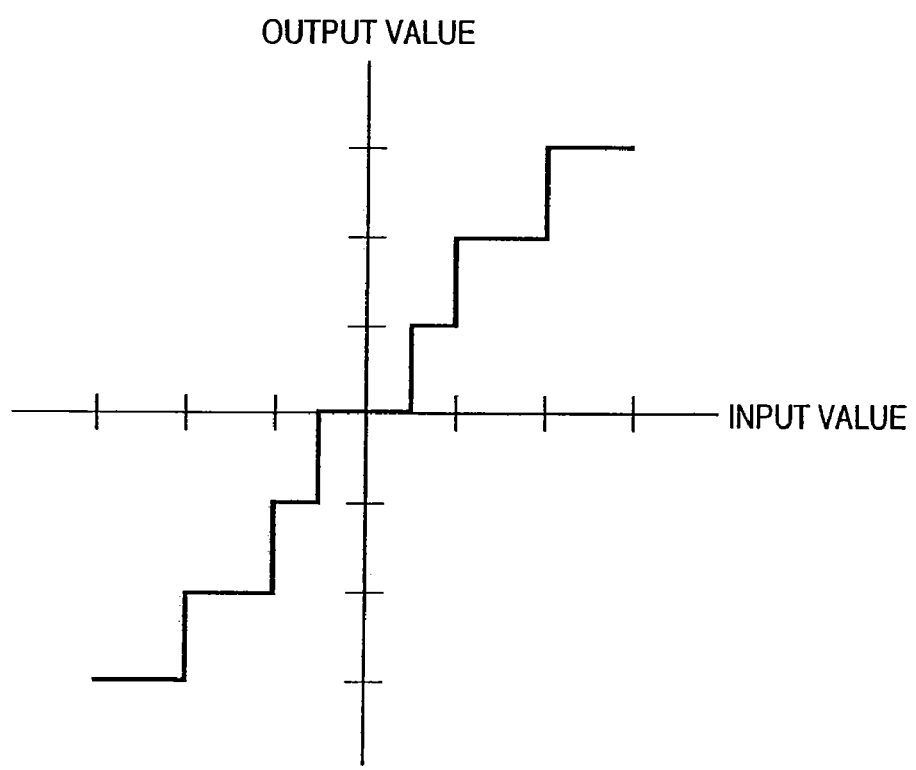
FIG. 3 is a graph showing the relationship between the input and output values in a quantizer.

The quantizer 105 quantizes the data group that has undergone discrete wavelet transformation and is output from the data composition unit 104. FIG. 3 shows the relationship between the input and output values in the quantizer 105. In this way, the quantizer 105 converts the wavelet transform coefficient values into quantized coefficient values (to be simply referred to as coefficient values hereinafter), and outputs them to the next entropy encoder 106.

Figure 4:
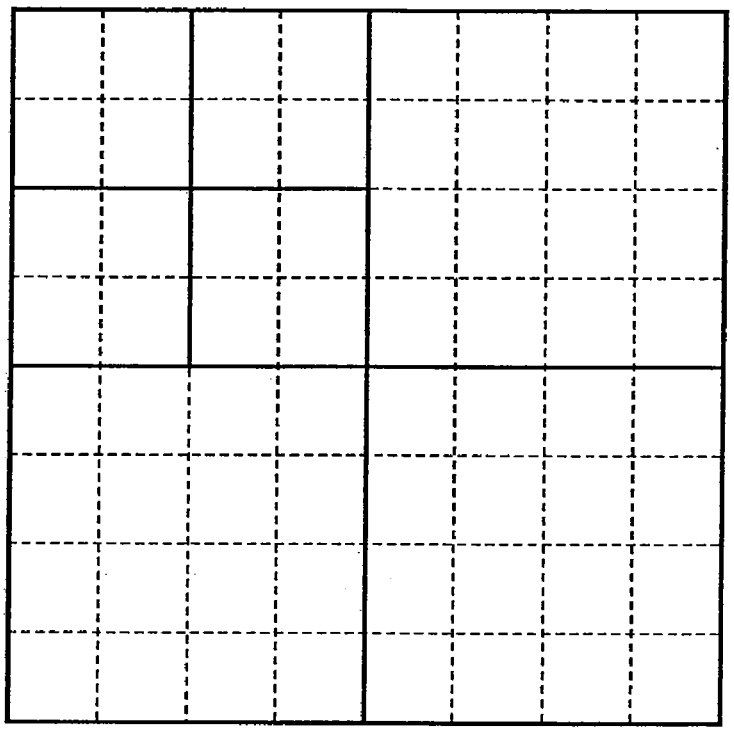
FIG. 4 is a view for explaining the relationship between subbands and code blocks.

The entropy encoder 106 segments the input coefficients into regions as a plurality of code blocks (indicated by the dotted lines in FIG. 4), as shown in FIG. 4. The entropy encoder 106 decomposes the coefficient values into bitplanes for each code block, and outputs their arithmetic encoding results as a code stream.

The code output unit 107 appends header information and the like to that code stream to generate a JPEG2000 file, and outputs that file to the recording device 108. The recording device 108 comprises a recording medium such as a memory card including a solid-state memory, optical disk, magnetic disk, or the like, read and write units of the recording medium, and the like, and records the input JPEG2000 file on the recording medium. The recording device 108 may have a playback function as a recorder/player. Also, the recording device 108 may be a device integrated with the image processing apparatus of the present invention, a device which can be connected to the image processing apparatus via a wired or wireless communication, or a computer or server connected on a network.

The data group output from the data composition unit 104 is also input to the inverse discrete wavelet transformer 205, and can be inversely transformed into an original baseband image signal. The inversely transformed image signal is input to the display buffer memory 206. The image output unit 207 can output the image signal from the display buffer memory 206 to the display device 208 such as a liquid crystal display monitor (LCD) or the like so as to display a visible image on the display device 208.

The operation of the data composition unit 104 when a plurality of images are to be composited or switched using the image processing apparatus of the present invention and especially when a seamless moving image is to be switched for respective frames, will be described below.

Figure 5A:
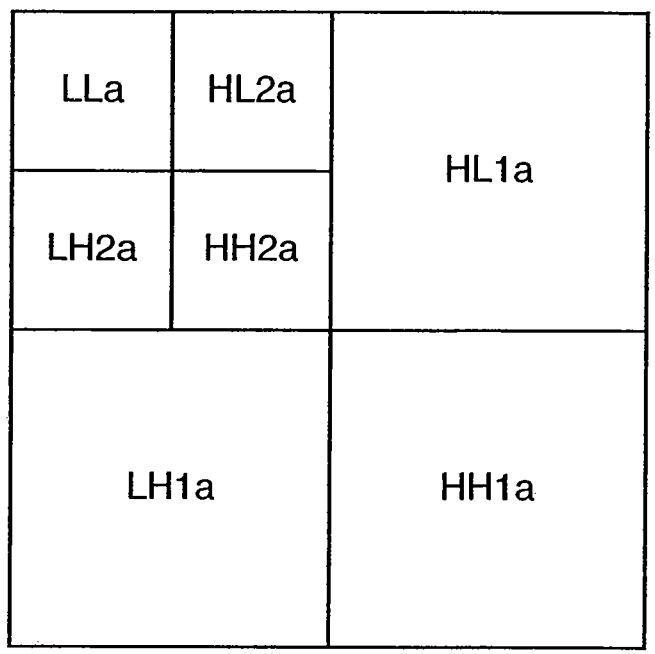
FIGS. 5A and 5B are views showing subbands of two images to be composited.

A first moving image output from the first image input unit 101 is segmented into bands by the first discrete wavelet transformer 102, as shown in FIG. 5A, and is stored as a first data group in the first memory 103 while being updated for each frame.

Figure 5B:
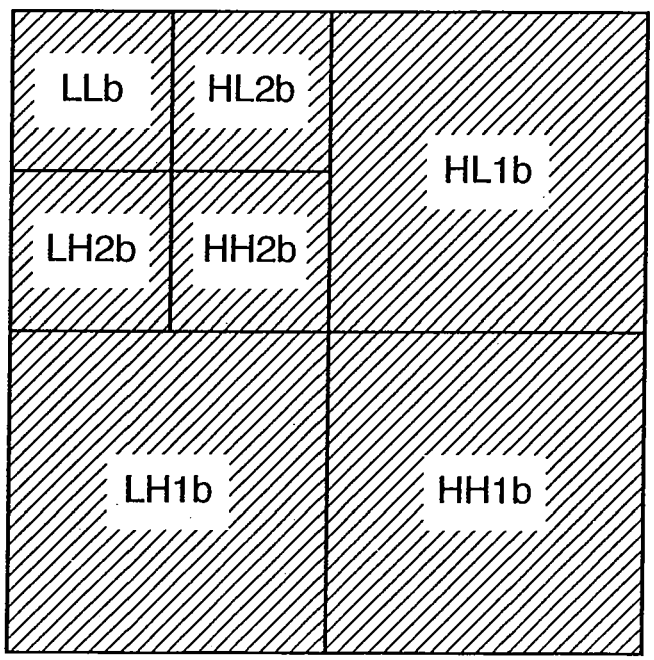

Likewise, a second moving image output from the second image input unit 201 is segmented into bands by the second discrete wavelet transformer 202, as shown in FIG. 5B, and is stored as a second data group in the second memory 203 while being updated for each frame.

The outputs from the first and second memories are input to the data composition unit 104. The data composition unit 104 is also connected to the external input unit 204, and can receive a data group obtained by segmenting a moving image into bands from an external device or system. The data composition unit 104 can freely composite the aforementioned first and second moving images and the moving image input from the external input unit 204.

For example, the process to be executed when image data from the first and second memories 103 and 203 are composited and switched will be explained below. Note that a "process that composites a plurality of moving images, and switches images along with the elapse of time" to be described in the subsequent embodiments will be referred to as "cross-fade".

The cross-fade process of this embodiment using the data composition unit 104 is effective upon producing, e.g., a visual effect that gradually switches scenes from the first moving image input from the first image input unit 101 to the second moving image input from the second image input unit 201. When the first moving image is switched to the second moving image, a new data group is reconstructed while sequentially replacing subband data in each frame that forms a moving image from components which form the first moving image to those which form the second moving image along with the elapse of time (frame transition), and is output as a third moving image from the data composition unit 104, as shown in FIGS. 6A to 6F as a description of the process of the data composition unit 104.

The cross-fade process executed by the data composition unit 104 will be described in detail below using FIGS. 6A to 6F. Assume that the data group of the first moving image has a configuration shown in FIG. 5A, and that of the second moving image has a configuration shown in FIG. 5B.

Figure 6A:
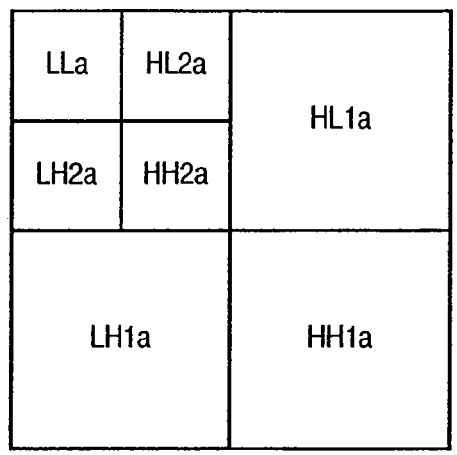
FIGS. 6A to 6F are views for explaining a method of replacing subband components.

During a period before the beginning of the cross-fade process, all data output from the data composition unit 104 are those of only the data group of the first moving image, as shown in FIG. 6A.

Figure 6B:
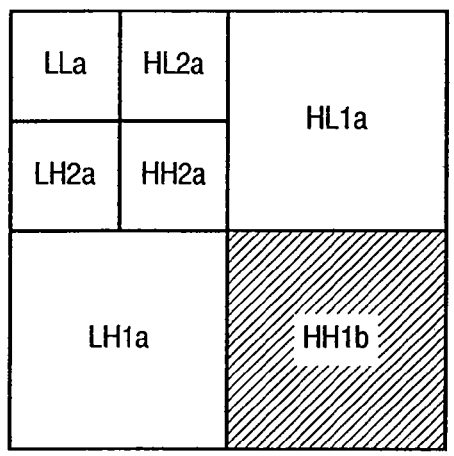

When the cross-fade process has started, subband components HH1*a* in the data group of the first moving image are replaced by corresponding subband components HH1*b* in the data group of the second moving image during a video period from the beginning of the cross-fade process until the 30th frame (about 1 sec in NTSC), as shown in FIG. 6B, and other subbands use those of the first data group intact, thus outputting a third data group as a result of this process.

Figure 6C:
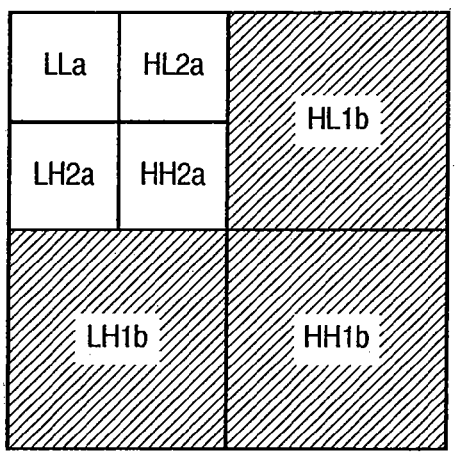

Next, subband components HH1*a*, HL1*a*, and LH1*a* in the data group of the first moving image are respectively replaced by corresponding subband components HH1*b*, HL1*b*, and LH1*b* in the data group of the second moving image during a video period from the 31st frame to the 60th frame while the cross-fade process is in progress, as shown in FIG. 6C, and other subbands use those of the first data group intact, thus outputting a third data group as a result of this process.

Figure 6D:
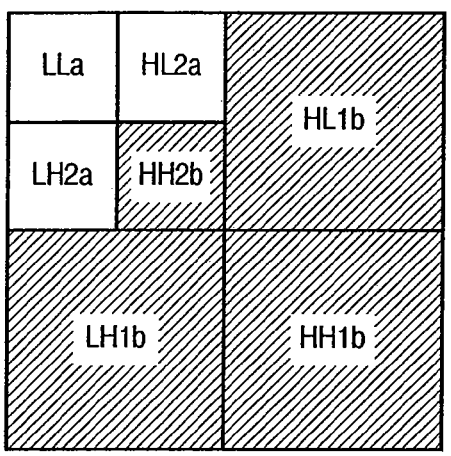

Then, subband components HH1*a*, HL1*a*, LH1*a*, and HH2*a* in the data group of the first moving image are respectively replaced by corresponding subband components HH1*b*, HL1*b*, LH1*b*, and HH2*b* in the data group of the second moving image during a video period from the 61st frame to the 90th frame while the cross-fade process is in progress, as shown in FIG. 6D, and other subbands use those of the first data group intact, thus outputting a third data group as a result of this process.

Figure 6E:
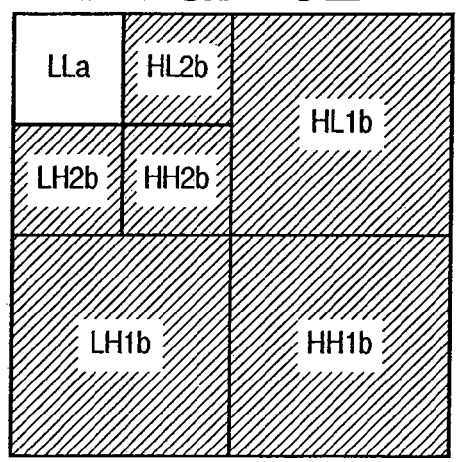

Finally, all subband components in the data group of the first moving image except for subband components LLa are replaced by corresponding subband components in the data group of the second moving image during a video period from the 91st frame to the 120th frame while the cross-fade process is in progress, as shown in FIG. 6E, thus outputting a third data group as a result of this process.

Figure 6F:
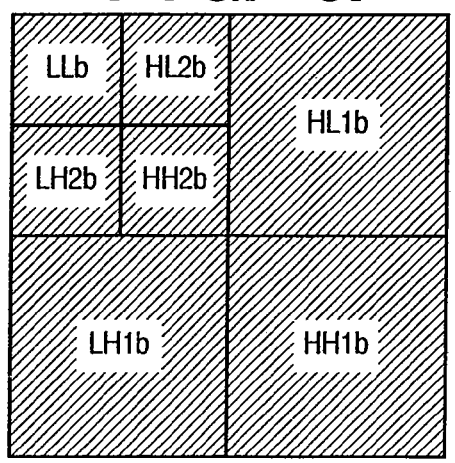

After the 120th frame from the beginning of the cross-fade process, all data output from the unit 104 are those of only the data group of the second moving image, as shown in FIG. 6F, thus ending the cross-fade process (switching from the first moving image to the second moving image is complete).

Note that the switching timing is set as described above as an example. However, the number of frames or time interval may be arbitrarily set as long as it can fall within an appropriate range for the visual effect upon executing the cross-fade process.

The third data groups generated in the processes of FIGS. 6A to 6F form moving image data to be actually displayed on the display device 208 or to be recorded by the recording device 108 after the aforementioned process.

Figure 9:
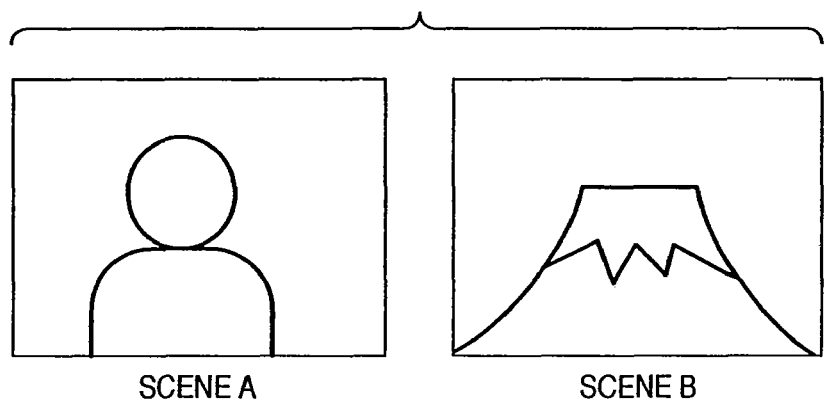
FIG. 9 shows an example of two images which are to undergo a cross-fade process of the present invention.
Figure 11A:
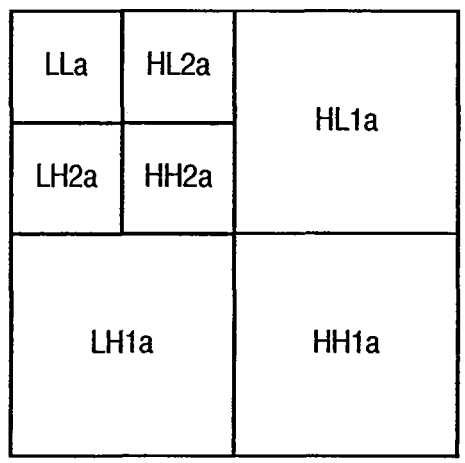
FIGS. 11A to 11E are views for explaining another method of replacing subband components of two images.
Figure 11B:
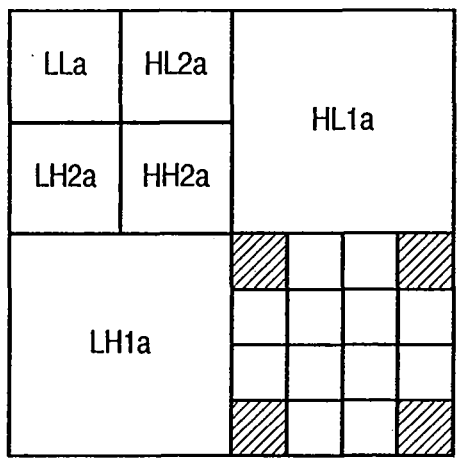
Figure 11C:
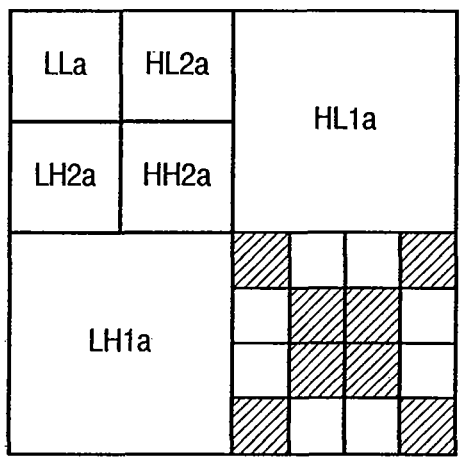
Figure 11D:
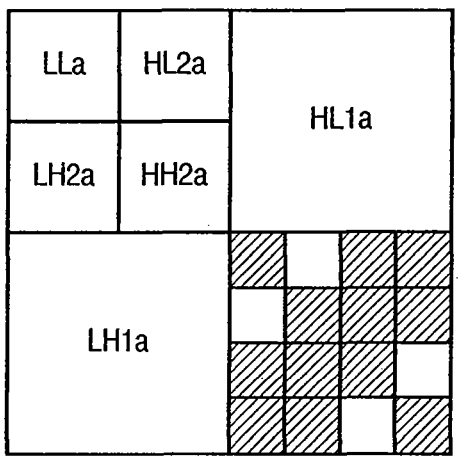
Figure 11E:
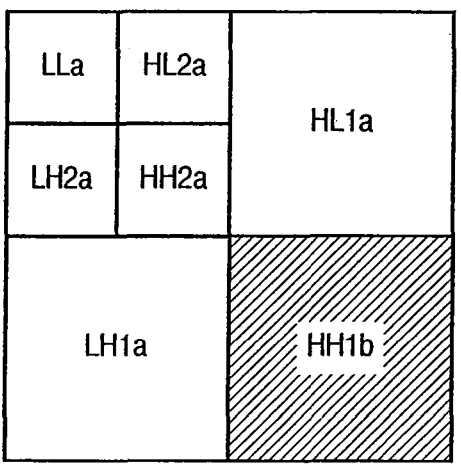
Figures 12A, 12B, 12C, 12D, 12E:
FIGS. 12A to 12E are views for explaining still another method of replacing subband components of two images.
Figure 13:
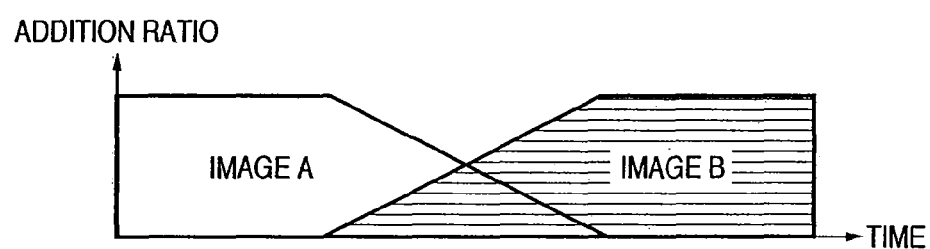
FIG. 13 is a view for explaining the operation of a conventional special effect.
Figure 14:
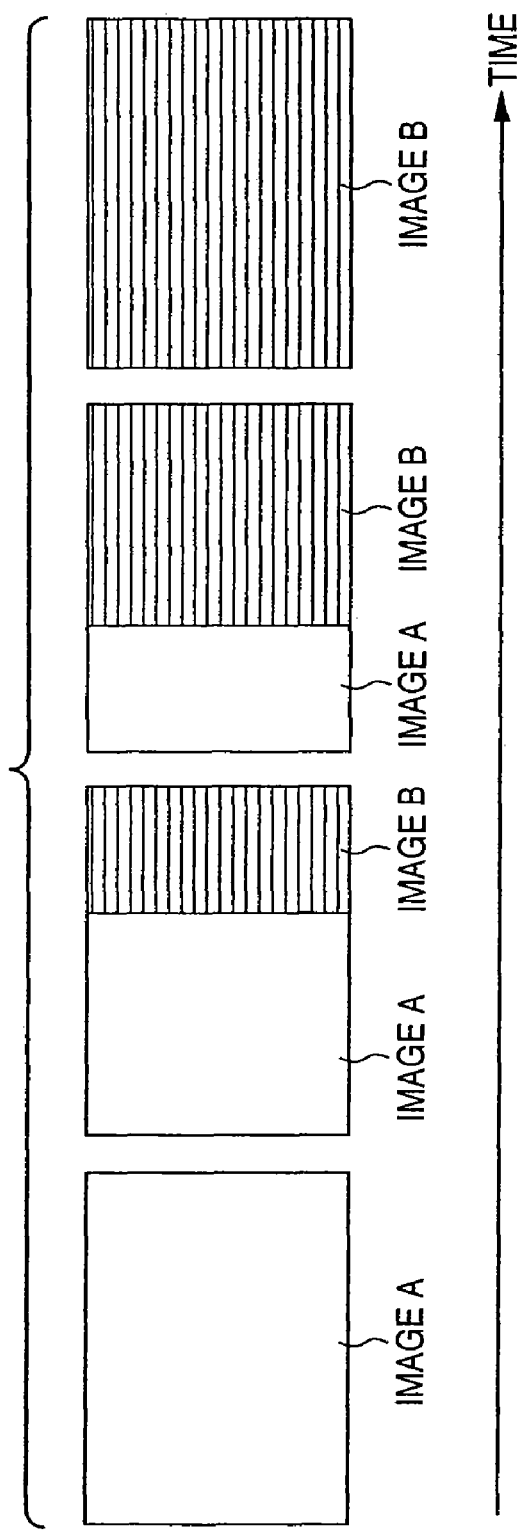
FIG. 14 is a view for explaining display of a conventional special effect.

As a display pattern upon executing the cross-fade process by the image processing apparatus with the above arrangement, if the first and second moving images respectively correspond to scenes A and B in FIG. 9, a display pattern that gradually switches from scene A to scene B along with the elapse of time, as shown in FIG. 10, can be realized.

To add an explanation about FIG. 10, when the cross-fade process that switches from scene A to scene B has started, high-frequency components of scene A are gradually reduced, and low-frequency components are then gradually reduced along with the elapse of time. Finally, upon completion of the cross-fade process, components of scene A become zero. Conversely, as for scene B, when the cross-fade process has started, high-frequency components are gradually reduced, and low-frequency components are then gradually reduced along with the elapse of time. Finally, all components of the frame are switched to those of the image signal of scene B upon completion of the cross-fade process.

If a composite state of the two images is to be displayed all the time in place of completely switching the image from scene A to scene B, the data composition unit 104 can be controlled to hold one of the composite states in FIGS. 6B to 6E.

Furthermore, the image processing apparatus of the present invention can time-serially or randomly switch three band-segmented data groups from the first and second memories 103 and 203 and the external input terminal 204. Of course, the image processing apparatus of the present invention can cope with a case wherein a plurality of external input terminals 204 are provided, or the number of image input units is increased.

The process for replacing corresponding subbands of a plurality of images as the cross-fade process of the data composition unit 104 is not limited to the method of replacing subbands of high-frequency components in turn, as shown in FIGS. 6A to 6F. For example, subbands may be replaced in turn from that (e.g., LL) of low-frequency components.

Furthermore, upon replacing subbands, all subband components HH1 are simultaneously replaced in FIGS. 6A and 6B above. As another method, subband HH1 may be further segmented into code blocks and may be replaced in turn for respective code blocks along with the elapse of time (the progress of frames), as shown in FIGS. 11A to 11E.

Moreover, control may be made to replace while changing the addition ratio of corresponding subband components of the two images along with the elapse of time (the progress of frames), as shown in FIGS. 12A to 12E.

As described above, using the image processing apparatus described in this embodiment, such new special effect can be provided in the process of input images, and can be used as an effect of a video camera, edit device, and the like.

Second Embodiment

The second embodiment will explain an arrangement (playback system) associated with a decoding function of the image processing apparatus explained in the first embodiment. The decoding function is used when a JPEG 2000 file recorded on the recording device 108 is reconstructed, and the reconstructed file is played back. At this time, assume that the recording device 108 is a recorder/player having a playback function, and a JPEG file to be played back contains a moving image that has undergone the cross-fade process explained in the first embodiment.

Figure 7:
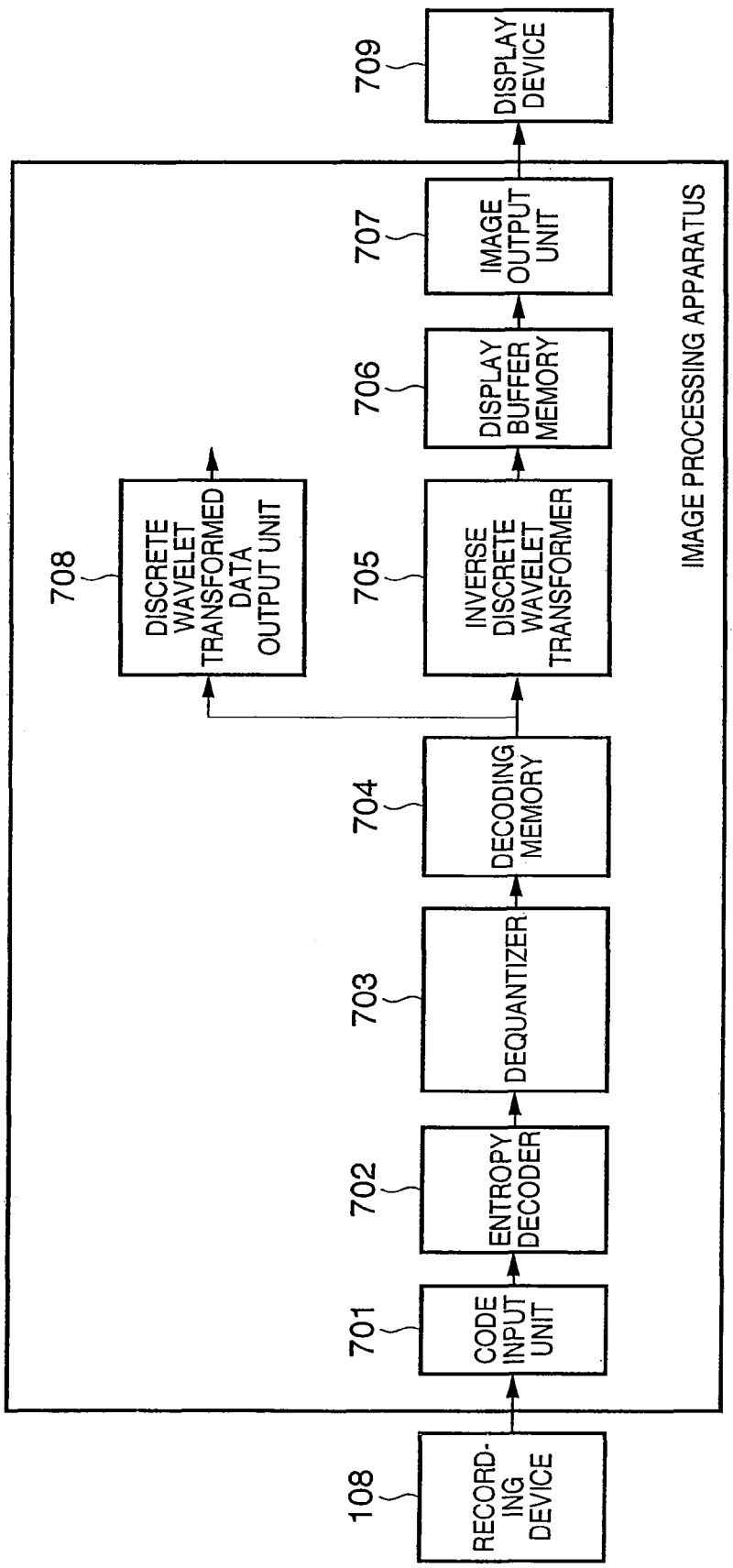
FIG. 7 is a block diagram of a system which includes an image processing apparatus according to the second embodiment of the present invention.

FIG. 7 is a block diagram showing an example of the arrangement of an image processing system as a combination of an image processing apparatus according to the second embodiment of the present invention, a recording device, and a display device.

Referring to FIG. 7, reference numeral 108 denotes a recording device having a playback function; 701, a code input unit; 702, an entropy decoder; 703, a dequantizer; 704, a decoding memory; 705, an inverse discrete wavelet transformer; 706, a display buffer memory; 707, an image output unit; 708, a discrete wavelet transformed data output unit; and 709, a display device such as an LCD or the like.

Image data (JPEG2000 file) recorded on the recording device 108 is reconstructed, and is input to the code input unit 701. The code input unit 701 analyzes management information (header) contained in the image data to extract parameters required for the subsequent processes.

The entropy decoder 702 decodes quantized coefficient values. The decoded coefficient values are output to the next dequantizer 703. The dequantizer 703 dequantizes the input coefficient values and stores discrete wavelet transform coefficients obtained as a result in the decoding memory 704.

The inverse discrete wavelet transformer 705 computes the inverse discrete wavelet transforms of the transform coefficients stored in the decoding memory 704, and this sequence will be explained below.

Figure 8:
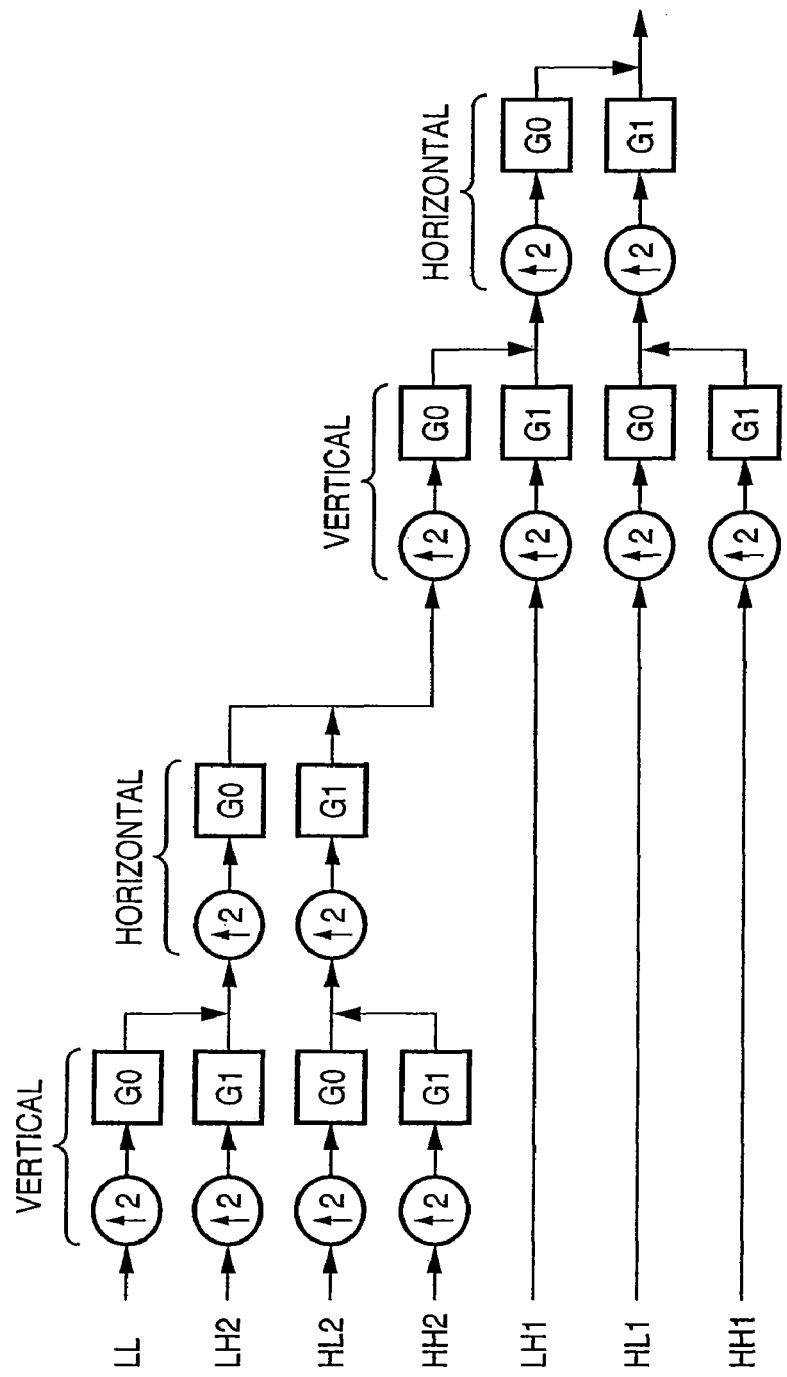
FIG. 8 is a view for explaining the operation of an inverse discrete wavelet transformer.

FIG. 8 is a view for explaining the detailed arrangement of the inverse discrete wavelet transformer 705. The inverse discrete wavelet transformer 705 reads out transform coefficients from subbands LL2 and LH2 of those of the data group stored in the decoding memory 704 in the vertical direction, and upsamples them to 1:2. Then, the transformer 705 applies a filter process using filter G0 to LL2, and that using filter G1 to LH2, and adds the filtered coefficients. Also, the transformer 705 applies the same process to HL2 and HH2. The transformer 705 reads out the aforementioned processing results in the horizontal direction, applies the filter process using filter G0 to the results obtained from LL2 and LH2 after upsampling, applies the filter process using filter G1 to the results obtained from HL2 and HH2 after upsampling, and adds the filtered coefficients. In this way, composition of one level is complete. By repeating the aforementioned process for all the levels, a baseband image signal can be reconstructed from the data group.

In FIG. 7, the image signal output from the inverse discrete wavelet transformer 705 is input to the display buffer memory 706. The image output unit 707 can output the image signal from the display buffer memory 706 to the display device 709 such as a liquid crystal display monitor (LCD) or the like so as to display a visible image on the display device 709.

The discrete wavelet transformed data output unit 708 can externally output the output from the decoding memory 704.

Using the image processing apparatus of the second embodiment with the aforementioned arrangement, since image data reconstructed from the recording device 108 can be decoded, played back, and displayed, a cross-fade moving image in a video part in a playback moving image can be played back and displayed, as shown in FIGS. 9 and 10, as in the first embodiment.

Furthermore, when the data group of a playback image output from the inverse discrete wavelet transformer 705 is used as the input to the external input unit 204 in FIG. 1 explained in the first embodiment, the cross-fade process of the playback image from the recording device 108, and the input image from the first or second image input unit 101 or 201 can be executed.

As described above, using the image processing apparatus explained in this embodiment, a new special effect can also be provided using a playback image, and can be used as an effect of a video camera, edit device, and the like.

Third Embodiment

Figure 15:
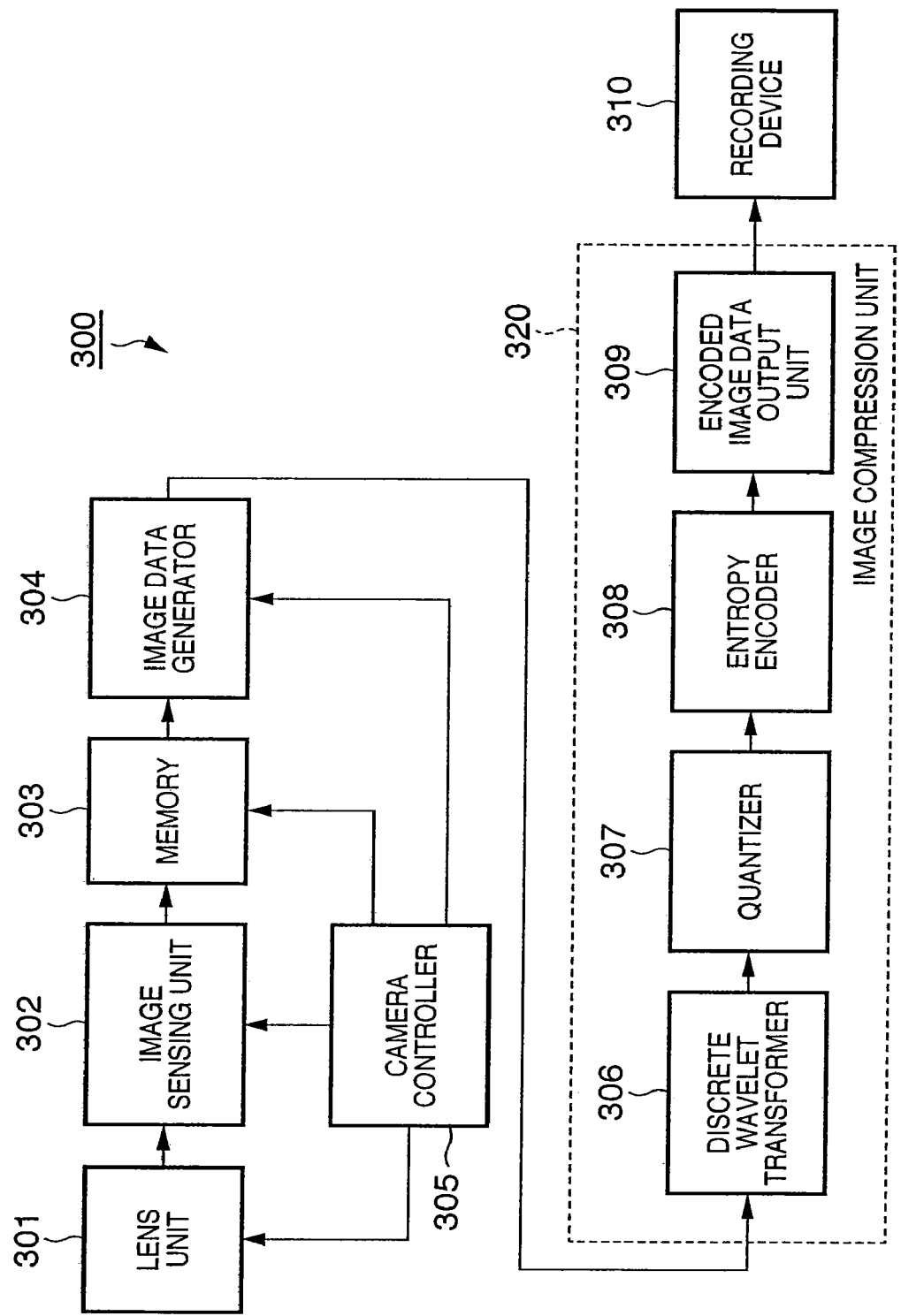
FIG. 15 is a block diagram showing an example of the arrangement of a recording system of a recording processing apparatus according to the third embodiment of the present invention.
Figure 16:
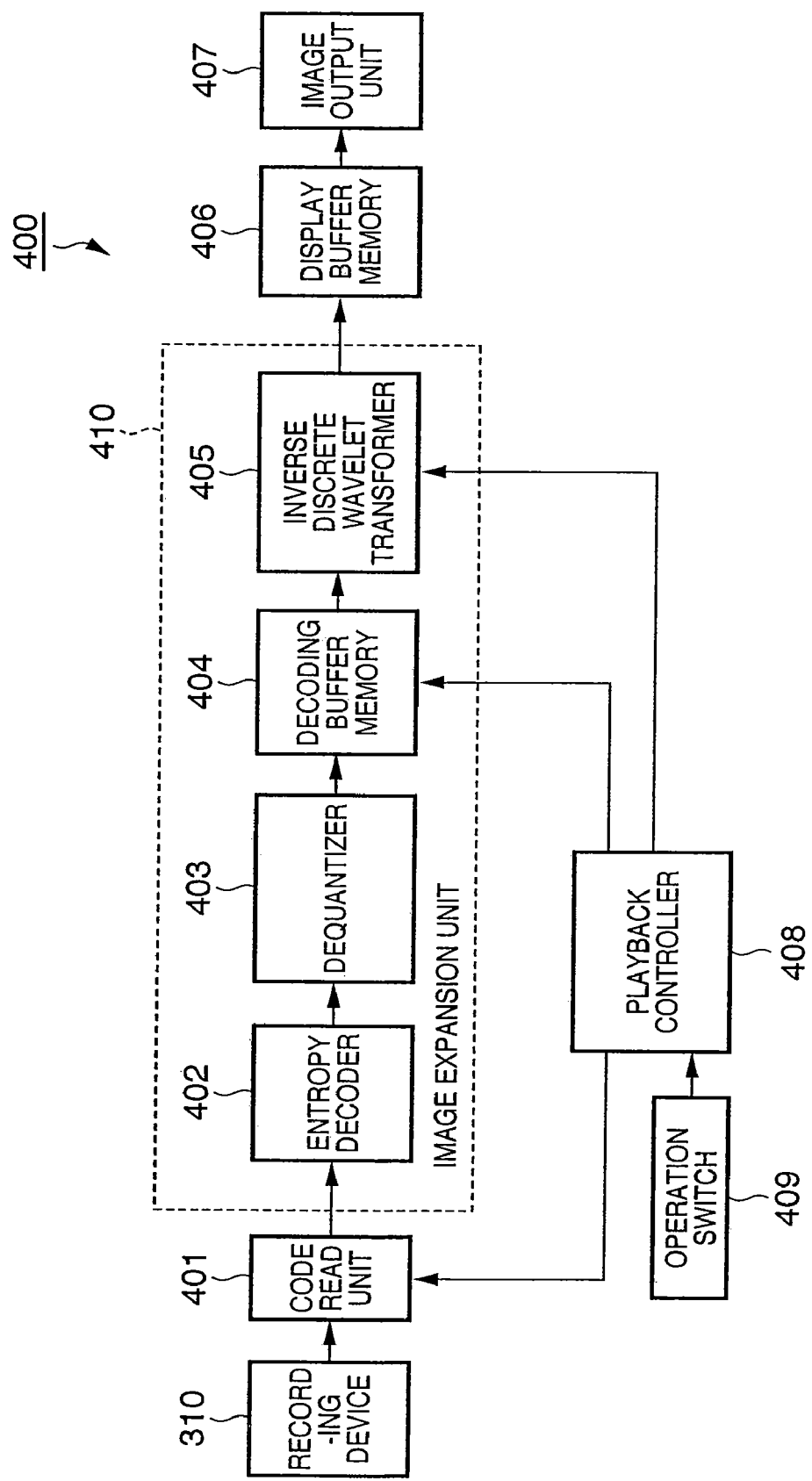
FIG. 16 is a block diagram showing an example of the arrangement of a playback system of the recording processing apparatus according to the third embodiment of the present invention.

FIG. 15 is a block diagram showing an example of the arrangement of a recording system 300 in a recording/playback apparatus as an example of the image processing apparatus of the present invention, and FIG. 16 is a block diagram showing an example of the arrangement of a playback system 400 in that apparatus.

(Arrangement of Recording System 300)

The arrangement and operation of the recording system 300 will be described below with reference to FIG. 15. Referring to FIG. 15, reference numeral 301 denotes a lens unit which comprises a lens, aperture, and the like; and 302, an image-sensing unit which comprises an image-sensing element such as a CCD, CMOS sensor, or the like. Reference numeral 303 denotes a memory for temporarily storing data output from the image-sensing unit 302. Reference numeral 304 denotes an image data generator for applying a predetermined process to image data temporarily stored in the memory 303. Reference numeral 305 denotes a camera controller for systematically controlling the lens unit 301 to the image data generator 304.

(Operation of Recording System 300)

Light that has entered via the lens unit 301 forms an image on the image-sensing element of the image-sensing unit 302. The image-sensing element of the image-sensing unit 302 is driven in accordance with a drive control signal from the camera controller 305. The output signal from the image-sensing element is A/D-converted in the image-sensing unit 302, and is then stored in the memory 303. The stored image data is input to the image data generator 304 in response to a memory read control signal from the camera controller 305.

The image data generator 304 executes a pixel interpolation process, color arithmetic process, gamma process, and the like to generate baseband image data for one frame. The image data generated by the image data generator 304 is input to an image compression unit 320 (to be described later).

In this embodiment, a compression encoding process complying with so-called JPEG2000 that segments image data into a plurality of bands and compresses/expands them is executed as an image compression encoding process of the image compression unit 320. Since the JPEG2000 compression encoding method has been explained in ISO/IEC 15444 in detail, only techniques required to help understand this embodiment will be explained below.

The image data generated by the image data generator 304 is input to a discrete wavelet transformer 306 of the image compression unit 320, and undergoes a two-dimensional discrete wavelet transformation process. In this embodiment, the discrete wavelet transformer 306 that segments an input signal into bands can adopt the arrangement shown in FIG. 2A explained in the first embodiment.

Subband transform coefficients output from the discrete wavelet transformer 306 are output to a quantizer 307 in FIG. 15. The quantizer 307 quantizes the subband transform coefficients output from the discrete wavelet transformer 306. The quantizer 307 in this embodiment can have the same quantization characteristics as those explained using FIG. 3. The quantizer 307 linearly quantizes the subband transform coefficients to convert them into quantization indices, and outputs them to a subsequent entropy encoder 308.

The entropy encoder 308 decomposes the input quantization indices into bitplanes, entropy-encodes for each bitplane, and outputs the results as a code stream. An encoded image data output unit 309 appends header information and the like to the code stream to generate a predetermined file, and outputs that file to a recording device 310. The recording device 310 comprises a memory card, optical disk, magnetic disk, or the like. As the recording device 310, a computer or server connected via a network may be used.

(Arrangement of Playback System 400)

The playback system 400 of the recording/playback apparatus according to this embodiment will be described below. FIG. 16 is a block diagram showing an example of the arrangement of the playback system 400, which expands and plays back image data encoded by the recording system 300 shown in FIG. 15.

Referring to FIG. 16, reference numeral 310 denotes the recording device shown in FIG. 15; 401, a code-read unit; 402, an entropy decoder; 403, a dequantizer; 404, a decoding buffer memory; and 405, an inverse discrete wavelet transformer. The components 402 to 405 form an image expansion unit 410 that expands image data. Reference numeral 406 denotes a display buffer memory; 407, an image output unit such as an LCD, CRT, or the like; and 408, a playback controller for systematically controls the playback system 400. An operation switch 409 which allows the user to designate various playback operations is connected to the playback controller 408.

(Operation in Normal Playback Mode)

The operation in a normal playback mode will be explained first. Image data which is compression-encoded by the aforementioned recording system 300 and is recorded on the recording device 310 is read out by the code-read unit 401. The code-read unit 401 analyzes a header contained in a data stream to extract parameters required for the subsequent decoding process.

After that, the entropy decoder 402 decodes quantized coefficient values by executing a decoding process opposite to the entropy encoder 308. The decoded coefficient values are output to the next dequantizer 403. The dequantizer 403 dequantizes the input coefficient values using the same quantization characteristics as the quantizer 307, and stores discrete wavelet transform coefficients obtained as a result in the decoding buffer memory 404.

The inverse discrete wavelet transformer 405 has the same arrangement as the inverse discrete wavelet transformer 705 described in the first embodiment with reference to FIG. 8. That is, the inverse discrete wavelet transformer 405 computes the inverse discrete wavelet transforms of the transform coefficients stored in the decoding buffer memory 404 to decode baseband image data.

The baseband image data decoded by the inverse discrete wavelet transformer 405 is input to the display buffer memory 406. The image output unit 407 outputs the data from the display buffer memory 406 to a display device such as an LCD, CRT monitor, or the like as a visible image.

Figure 17A:
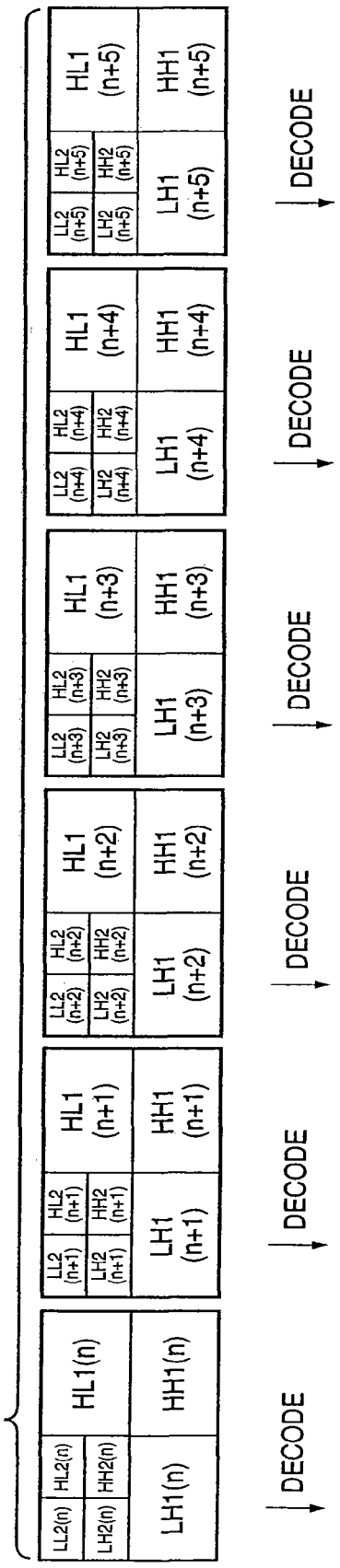
FIGS. 17A and 17B are views for explaining the relationship between subband transform coefficients of respective frames and images to be decoded and played back in a normal playback mode according to the third embodiment of the present invention.
Figure 17B:
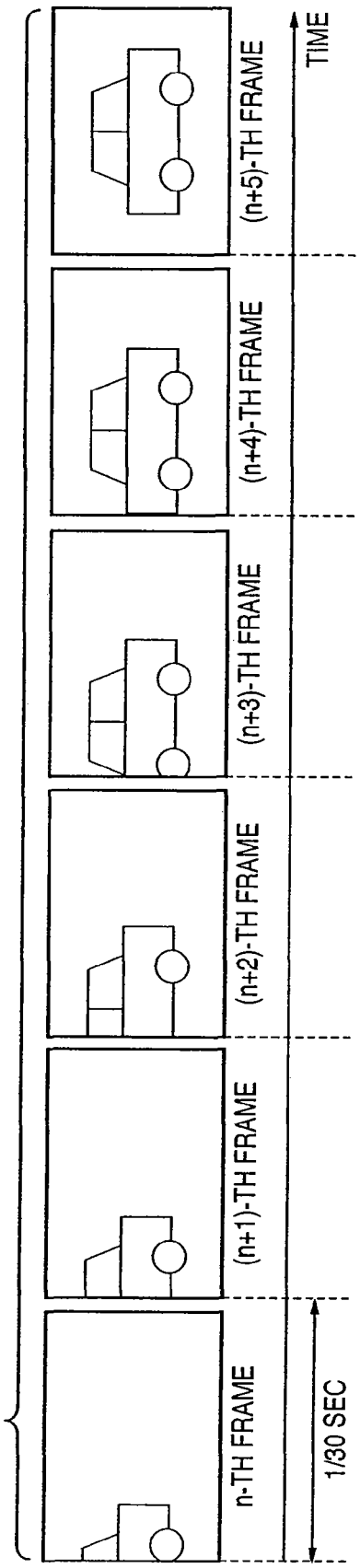

In this way, the playback controller 408 controls to decode all subband transform coefficients of respective frames shown in FIG. 17A, and to decode and display images in order of time, as shown in FIG. 17B, in the normal playback mode. In FIG. 17B, n, n+1, . . . indicate the order of successive frame images. In this example, the (n+1)-th frame image is displayed at a time interval of 1/30 sec after the n-th frame image.

(Operation in High-Speed Playback Mode)

The operation upon making high-speed playback (search) using the playback system 400 in FIG. 16 will be described below.

Upon reception of a high-speed playback (double-speed playback in this case) instruction from the operation switch 409, the playback controller 408 notifies the code-read unit 401 of double-speed playback. The code-read unit 401 reads out subband transform coefficients of respective frames from the recording device 310 in accordance with correspondence between the notified playback speed and a predetermined frame read method in the high-speed playback mode.

That is, in the normal playback mode, transform coefficients of all subbands of each frame are read out, decoded, and played back. However, in the high-speed playback mode, a frame in which subband transform coefficients of all subbands are to be read out, and a frame in which subband transform coefficients of only some subbands are to be read out are present. In this embodiment, upon reception of an m×-speed playback (m is an integer equal to or larger than 2) instruction, subband transform coefficients of all subbands are read out for one frame per m frames, and subband transform coefficients of only LL subband of the lowest level (LL2 subband since discrete wavelet transformation processes of two levels are made in this embodiment) are read out for the remaining (m−1) frames.

In this case, since the double-speed playback mode is designated, frames (n, n+2, n+4) in which only LL2 subband transform coefficients are to be read out and frames (n+1, n+3, n+5) in which all subband transform coefficients are to be read out alternately appear, as shown in FIG. 18A. Since the time required to read out only LL2 subband transform coefficients is sufficiently shorter than that required to read out all subband transform coefficients, the need for high-speed read access (i.e., data are loaded in the m×-speed playback mode at a speed m times that in the normal playback mode) described in Japanese Patent Laid-Open No. 2001-352524 can be obviated. The code-read unit 401 need only read out at a speed slightly higher than that in the normal playback mode even in the high-speed playback mode.

In order to read out only LL2 subband transform coefficients, a process for inhibiting subband transform coefficient data of subbands (hatched subbands) other than LL2 subband in FIG. 18A from being read out is executed by analyzing the header of the recorded image data.

The readout subband transform coefficient data are input to the entropy decoder 402 to decode quantized coefficient values. The decoded coefficient values are output to the dequantizer 403. The dequantizer 403 dequantizes the input coefficient values, and stores the obtained discrete wavelet transform coefficients in the decoding buffer memory 404.

After that, the playback controller 408 composites m successive frames to generate one composite frame in the decoding buffer memory 404. That is, (m−1) frames in which only LL2 subband transform coefficients are read out, and one frame in which all subband transform coefficients are read out are composited to generate one composite frame.

In this embodiment, the composite frame is generated by calculating the weighted means of the LL2 subband transform coefficients of the frame in which all subband transform coefficients are read out, and those of the remaining (m−1) frames.

That is, as shown in FIG. 18B, LL2 components LL2(n+1) and LL2(n) of the (n+1)-th and n-th frames are respectively multiplied by predetermined weighting coefficients α and β, and the products are added to calculate LL(n+1)' as LL subband transform coefficients after composition. That is, a weighted mean calculation to be made is described by:

$$LL(n+1)' = \alpha \times LL(n+1) + \beta \times LL(n)$$

In this embodiment, coefficients α and β satisfy α+β=1.0. Hence, upon compositing frames by calculating a simple average value, α=0.5, and β=0.5. On the other hand, when the LL components of the (n+1)-th frame are to be emphasized, coefficient values are determined to satisfy α>β (e.g., α=0.7, β=0.3) to make the weighted mean calculation. The subband transform coefficient values for one frame, which contains the weighted means of LL subband transform coefficients calculated in this way, are transformed into baseband image data by the inverse discrete wavelet transformer 405. After that, the image data is input to the display buffer memory 406, and is output to the image output unit 407 as a visible image, as shown in FIG. 18C.

In this manner, under the control of the playback controller 408, the playback system 400 alternately sets frames in which transform coefficients of only specific subband (LL subband in this embodiment) are read out, and frames in which transform coefficients of all subbands are read out, as shown in FIG. 18A, and calculates the weighted means of subband transform coefficients of the two successive frames for respective subbands to generate one composite frame, as shown in FIG. 18B. A baseband image signal is decoded and displayed based on this composite frame. By executing the read, composition, and decoding processes of subband coefficients for the two successive frames within one frame period (1/30), double-speed playback can be implemented, as shown in FIG. 18C.

As shown in FIG. 18C, in images to be displayed in the high-speed playback mode of this embodiment, since image components of the n-th and (n+2)-th frames, whose information is completely omitted by a simple frame downsampling method, are respectively displayed in playback images of the (n+1)-th and (n+3)-th frames like afterimages, a natural display effect can be obtained even when images are displayed in the double-speed playback mode.

As described above, in this embodiment, upon reading out subband transform coefficients recorded on the recording device, subband transform coefficients of all subbands are read out for one per m frames of recorded successive images, and only some subband transform coefficients (LL2 subband transform coefficients in this embodiment) need only be read out for the remaining downsampled (m−1) frames in the m×-speed playback mode. Therefore, all transform coefficients of all m frames need not be read out at an m×speed, and the required memory capacity and consumption power can be reduced.

Such high-speed playback method can be applied to m×-speed (m is an integer equal to or larger than 2) playback in addition to double-speed playback.

For example, upon executing triple-speed playback, the process can be made, as shown in FIGS. 19A to 19C. As can be seen from comparison with the process in the double-speed playback mode shown in FIGS. 18A to 18C, a common process is executed except that only LL2 subband transform coefficients are read out for two out of three successive frames, and the weighted means of LL2 subband transform coefficients in three frames are calculated in the triple-speed playback mode.

The weighted mean operation in the decoding buffer memory 404 multiplies LL2 components LL2(n+2), LL2(n+1), and LL2(n) of the (n+2)-th, (n+1)-th, and n-th frames by predetermined coefficients α, β, and γ, and adds these products, as shown in FIG. 19B. That is, LL2 subband coefficient LL2(n+2)' after composition is given by:

$$LL2(n+2)' = \alpha \times LL2(n+2) + \beta \times LL2(n+1) + \gamma \times LL2(n)$$

In this case $\alpha + \beta + \gamma = 1.0$. For example, upon calculating a simple average value, $\alpha = 0.33$, $\beta = 0.33$, and $\gamma = 0.33$. On the other hand, upon emphasizing the LL components of the (n+2)-th frame, the weighted mean is calculated while setting $\alpha = 0.5$, $\beta = 0.3$, and $\gamma = 0.2$. The subband coefficient values as the weighted means calculated in this way are transformed into baseband image data by the inverse discrete wavelet transformer 405. After that, the image data is input to the display buffer memory 406, and is output to the image output unit 407 as a visible image, as shown in FIG. 19C.

By executing the read, composition, and decoding processes of subband coefficients for the three successive frames within one frame period (1/30), triple-speed playback can be implemented.

In display images shown in FIG. 19C as well, since image components of the n-th and (n+1)-th frames, whose information is completely lost by a simple frame downsampling method, are respectively displayed in a decoded image of the (n+2)-th frame like afterimages, a natural display image can be displayed even when images are displayed in the triple-speed playback mode.

In the mx-speed playback mode, a weighted mean calculation of LL components for m frames is made using m weighting coefficients, and the obtained subband coefficients are transformed into baseband image data by the inverse wavelet transformer 405, thus obtaining an afterimage effect. Hence, visually natural mx-speed playback can be implemented even when an inter-frame motion is large.

Modification of Third Embodiment

In the aforementioned example, in a frame in which only some subband transform coefficients are read out (downsampled frame), only LL2 subband coefficients are read out, and a composite frame is generated by calculating the weighted means of the readout LL2 subband coefficients.

However, the types and number of subband transform coefficients to be read out for a downsampled frame can be arbitrarily set within a range in which they do not indicate all subband coefficients.

Figure 20A:
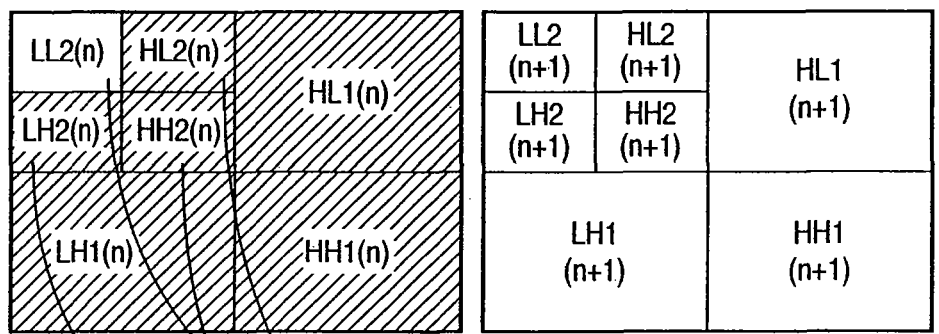
FIGS. 20A and 20B are views for explaining the relationship between subband transform coefficients to be read out from respective frames and images to be decoded and played back in a double-speed playback mode in a modification of the third embodiment.
Figure 20B:
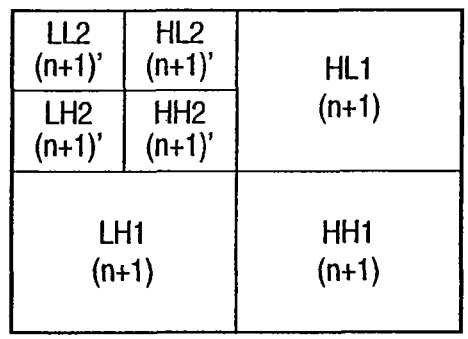
Figure 24:
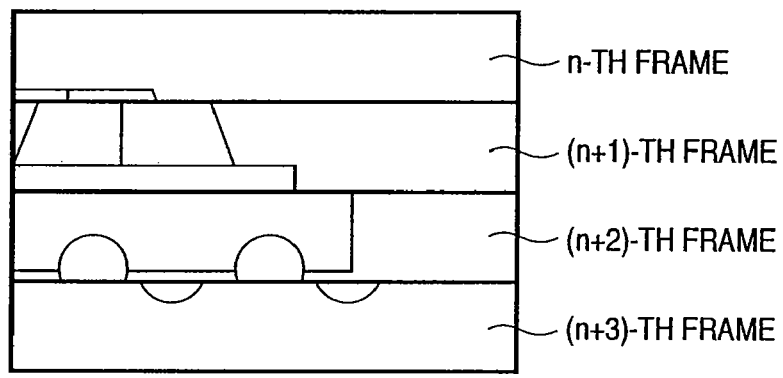
FIG. 24 shows a high-speed playback state of the images shown in FIG. 23 by the conventional method.

That is, as shown in FIGS. 20A and 20B, HL2, LH2, and HH2 subband transform coefficients may be read out in addition to LL2 subband transform coefficients, and the weighted means of these subband transform coefficients may be calculated to generate and play back a composite frame.

In this case, the weighted mean calculation is made for each subband. FIGS. 20A and 20B show the process in the double-speed playback mode. However, the same process applies in high-speed playback modes equal to or higher than triple-speed playback.

As described above, according to this embodiment, upon playing back an image, which is compression-encoded for a plurality of frequency band components, at high speed, some of subband transform coefficients which represent an image for one frame to be played back are generated from those of a plurality of successive frames. Hence, visually natural and smooth high-speed playback can be implemented by a simple process irrespective of any inter-frame motion.

Fourth Embodiment

In the third embodiment, the weighted means of subband transform coefficients common to frames to be composited are calculated to generate a composite frame. By contrast, this embodiment is characterized in that different subband transform coefficients are read out from frames to be composited to generate one composite frame.

Since the high-speed playback method to be explained in this embodiment can be practiced by the recording/playback apparatus explained in the third embodiment, a description associated with the arrangement of the recording/playback apparatus will be omitted. Also, since the process in the equal-speed playback mode is common to that of the third embodiment, only the operation in the high-speed playback mode will be explained below.

As in the third embodiment, double-speed playback will be explained first. For example, upon reception of a double-speed playback instruction from the operation switch 409 in FIG. 16, the playback controller 408 notifies the code-read unit 401 of double-speed playback. The code-read unit 401 reads out subband transform coefficients of respective frames from the recording device 310 in accordance with correspondence between the notified playback speed and a predetermined frame read method in the high-speed playback mode.

That is, in the normal playback mode, transform coefficients of all subbands of each frame are read out, decoded, and played back. However, in the high-speed playback mode, subband transform coefficients of different subbands in frames to be composited are read out. In this embodiment, upon reception of an mx-speed playback (m is an integer equal to or larger than 2) instruction, the read process is executed to obtain subband transform coefficients of different subbands from m successive frames, i.e., to obtain subband transform coefficients for all the types of subbands by the subband transform coefficients read out from these m frames.

Therefore, in the double-speed playback mode, as shown in, e.g., FIGS. 21A and 21B, subband transform coefficients of the second level (LL2, HL2, HH2, LH2) are read out from one frame of encoded image data of two successive frames, and those of the first level (HL1, HH1, LH1) are read out from the other frame, thus obtaining subband coefficients of all subbands required to composite one frame from image data for two successive frames.

That is, as for the n-th and (n+1)-th frames, HL1(n), HH1(n), and LH1(n) subband transform coefficient data are read out from image data of the n-th frame, and LL2(n+1), HL2(n+1), HH2(n+1), and LH2(n+1) subband transform coefficient data are read out from image data of the (n+1)-th frame.

In this manner, different subband transform coefficient data are read out from image data for two arbitrary, successive frames so that all subband transform coefficients for one frame can be combined, as shown in FIG. 21B.

The readout subband transform coefficient data are input to the entropy decoder 402 which decodes quantized coefficient values. The decoded coefficient values are output to the dequantizer 403. The dequantizer 403 dequantizes the input coefficient values, and stores the obtained discrete wavelet transform coefficients in the decoding buffer memory 404.

After that, the subband transform coefficient values for one frame, which are combined, as shown in FIG. 21B, are transformed into baseband image data by the inverse discrete wavelet transformer 405. The image data is then input to the display buffer memory 406, and is output to the image output unit 407 as a visible image, as shown in FIG. 21C.

In this manner, under the control of the playback controller 408, the playback system 400 reads out subband transform coefficients of different subbands from two successive frames of those shown in FIG. 21A to obtain subband transform coefficients of all subbands from these frames, as shown in FIG. 21B, in the double-speed playback mode. Then, a composite frame shown in FIG. 21B is generated, and a baseband image signal is decoded and displayed based on this composite frame. By executing the read, composition, and decoding processes of subband coefficients for the two successive frames within one frame period (1/30), double-speed playback can be implemented, as shown in FIG. 21C.

As shown in FIG. 21C, in images to be displayed in the high-speed playback mode of this embodiment, since image components of the n-th and (n+2)-th frames, whose information is completely omitted by a simple frame downsampling method, are respectively displayed in playback images of the (n+1)-th and (n+3)-th frames like afterimages, a natural display effect can be obtained even when images are displayed in the double-speed playback mode.

In this embodiment, upon reading out subband transform coefficients recorded on the recording device in an mx-speed playback mode, the header of data is analyzed, and different subband transform coefficients for respective frames are read out from image data for m successive frames, so that subband transform coefficients of all subbands for one frame can be formed by combining these different subband transform coefficients read out from m frames. Hence, since only some subband transform coefficients can be read out from each frame, all transform coefficients of all m frames need not be read out at an mx speed, and the required memory capacity and consumption power can be reduced, as in the third embodiment.

The method of this embodiment can also be applied to mx-speed (m is an integer equal to or larger than 2) playback in addition to double-speed playback, as in the third embodiment.

For example, upon executing triple-speed playback, the process can be made, as shown in FIGS. 22A to 22C. As can be seen from comparison with the process in the double-speed playback mode shown in FIGS. 21A to 21C, a common process is executed except that different subband transform coefficients for respective frames are read out from image data for three successive frames to form subband transform coefficients of all subbands for one frame by combining the subband transform coefficients read out from the three frames in the triple-speed playback mode.

In this example, as shown in FIG. 22A, a frame in which subband transform coefficients of the first level (HL1, HH1, LH1) are read out, a frame in which subband transform coefficients of the second level (HL2, HH2, LH2) except for LL2, and a frame in which only LL2 subband transform coefficients are read out repetitively appear. In this way, subband transform coefficients for all subbands for one frame can be obtained from those read out from the three successive frames.

The subband transform coefficient data (FIG. 22A) read out from the respective frames are input to the entropy decoder 402 which decodes quantized coefficient values. The decoded coefficient values are output to the next dequantizer 403. The dequantizer 403 dequantizes the input coefficient values, and stores the obtained discrete wavelet transform coefficients in the decoding buffer memory 404. After that, the subband transform coefficient values for one frame, which are combined, as shown in FIG. 22B, are transformed into baseband image data by the inverse discrete wavelet transformer 405. The image data is then input to the display buffer memory 406, and is output to the image output unit 407 as a visible image, as shown in FIG. 22C.

In this manner, under the control of the playback controller 408, the playback system 400 reads out subband transform coefficients of different subbands from three successive frames of those shown in FIG. 22A to obtain subband transform coefficients of all subbands from these frames, as shown in FIG. 22B, in the triple-speed playback mode. Then, a composite frame shown in FIG. 22B is generated, and a baseband image signal is decoded and displayed based on this composite frame. By executing the read, composition, and decoding processes of subband coefficients for the two successive frames within one frame period (1/30), double-speed playback can be implemented, as shown in FIG. 22C.

As shown in FIG. 22C, in images to be displayed in the high-speed playback mode of this embodiment, since image components of the n-th and (n+1)-th frames, whose information is completely lost by a simple frame downsampling method, are respectively displayed in a decoded image of the (n+2)-th frame like afterimages, a natural display effect can be obtained even when images are displayed in the triple-speed playback mode.

In the mx-speed playback mode, control is made to read out different subband transform coefficient data for respective frames from image data for m frames. The obtained subband coefficients are transformed into baseband image data by the inverse wavelet transformer 405, thus obtaining an afterimage effect. Hence, visually natural mx-speed playback can be implemented even when an inter-frame motion is large.

As described above, according to this embodiment, upon playing back an image, which is compression-encoded for a plurality of frequency band components, at high speed, subband transform coefficients that represent an image for one frame to be played back are generated from those of a plurality of successive frames without any redundancy. Hence, visually natural and smooth high-speed playback can be implemented by a simple process irrespective of any inter-frame motion.

Other Embodiments

The third and fourth embodiments described above can be combined. In this case, for example, in the fourth embodiment, the read control is made so that some subband transform coefficients are repetitively read out from data for m successive frames in the mx-speed playback mode. In the composition/assemble process in the decoding buffer memory 404, the repetitive subband transform coefficients undergo the weighted mean process done in the third embodiment to generate one composite frame.

In the above embodiments, JPEG2000 that adopts discrete wavelet transformation has been exemplified as a process for compressing an image by segmenting the image into a plurality of frequency bands. However, the present invention can be applied to other compression methods that compress an image by segmenting an image signal into a plurality of frequency bands, and the compression method itself is not particularly limited.

In the above embodiments, image data which is compression-encoded using two-dimensional discrete wavelet transformation processes of two levels has been exemplified. However, transformation processes of three or more levels may be made.

In the above embodiments, only the image processing apparatus consisting of a single device has been exemplified. However, equivalent functions may be implemented by a system consisting of a plurality of devices.

Note that the present invention includes a case wherein the equivalent functions are achieved by supplying a software program that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as long as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has met a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, an image is segmented into a plurality of frequency bands, and image data of corresponding frequency bands of a plurality of images are replaced, thus allowing image composition and switching with visual effects that cannot be realized by the conventional method.

Furthermore, upon playing back an image, which is recorded while being segmented into a plurality of frequency band, at high speed, since only some subband transform coefficients are read out for at least some frames, high-speed playback can be implemented without any frames from which information is lost. Hence, even when an image with an inter-frame motion is to be played back at high speed, visually natural and smooth high-speed playback can be implemented.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for receiving and processing a plurality of moving image signals, and outputting one moving image signal, said image processing apparatus comprising:
    a first image input unit which inputs a first moving image signal;
    a second image input unit which inputs a second moving image signal;
    a band segmentation unit which segments a first frame image in the first moving image signal into a plurality of different frequency band components and which segments a second frame image in the second moving image signal into a plurality of different frequency band components; and
    an image composition unit which composites the first frame image and the second frame image, each of the first frame image and the second frame image having been segmented by said band segmentation unit, by replacing some or all image data in common frequency band components between the first frame image and the second frame image, and which generates a third moving image signal composed of composited frame images,
    wherein, when the output of said image processing apparatus is switched from the first moving image signal to the second moving image signal, said image composition unit outputs the third moving image signal in an interval of the first moving image signal and the second moving image signal.

2. The image processing apparatus according to claim 1, wherein said image composition unit gradually replaces image data in frequency band components of third frame images in the third moving image signal, from image data in frequency band components of the first frame image to image data in frequency band components of the second frame image.

3. The image processing apparatus according to claim 1, wherein said image composition unit is a unit that applies a visual effect to images, and
    wherein third frame images in the third moving image signal represent a cross fade effect between the first frame image and the second frame image.

4. An apparatus-implemented image processing method for receiving and processing a plurality of moving image signals, and outputting one moving image signal, said image processing method comprising:
    a first image input step of inputting a first moving image signal;
    a second image input step of inputting a second moving image signal;
    a band segmentation step of segmenting a first frame image in the first moving image signal into a plurality of different frequency band components and of segmenting a second frame image in the second moving image signal into a plurality of different frequency band components; and an image composition step of compositing the first frame image and the second frame image, each of the first frame image and the second frame image having been segmented by said band segmentation step, by replacing some or all image data in common frequency band components between the first frame image and the second frame image, and of generating a third moving image signal composed of composited frame images, wherein, when output is switched from the first moving image signal to the second moving image signal, said image composition step outputs the third moving image signal in an interval of the first moving image signal and the second moving image signal.

5. A computer-readable recording medium storing a program code for causing a computer to execute:

a first image input step of inputting a first moving image signal;

a second image input step of inputting a second moving image signal;

a band segmentation step of segmenting a first frame image in the first moving image signal into a plurality of different frequency band components and of segmenting a second frame image in the second moving image signal into a plurality of different frequency band components; and an image composition step of compositing the first frame image and the second frame image, each of the first frame image and the second frame image having been segmented by said band segmentation step, by replacing some or all image data in common frequency band components between the first frame image and the second frame image, and of generating a third moving image signal composed of composited frame images, wherein, when output is switched from the first moving image signal to the second moving image signal, said image composition step outputs the third moving image signal in an interval of the first moving image signal and the second moving image signal, and wherein the recording medium is one of a magnetic recording medium, an optical recording medium, and a semiconductor memory.

* * * * *